(12) United States Patent
Yoon et al.

(10) Patent No.: US 11,390,984 B2
(45) Date of Patent: Jul. 19, 2022

(54) FABRIC TREATING APPARATUS

(71) Applicant: LG ELECTRONICS INC., Seoul (KR)

(72) Inventors: Jihyun Yoon, Seoul (KR); Jeongjoon Roh, Seoul (KR); Ayeong Lee, Seoul (KR); Taehee Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 211 days.

(21) Appl. No.: 16/590,988

(22) Filed: Oct. 2, 2019

(65) Prior Publication Data

US 2020/0109511 A1 Apr. 9, 2020

(51) Int. Cl.
| | |
|---|---|
| *D06F 73/02* | (2006.01) |
| *D06F 39/12* | (2006.01) |
| *B65G 25/08* | (2006.01) |
| *B65G 41/00* | (2006.01) |

(52) U.S. Cl.
CPC .............. *D06F 73/02* (2013.01); *B65G 25/08* (2013.01); *B65G 41/002* (2013.01); *D06F 39/12* (2013.01); *B65G 2201/0229* (2013.01)

(58) Field of Classification Search
CPC .................. B65G 25/08; B65G 41/002; B65G 2201/0229; D06F 73/02; D06F 39/12
See application file for complete search history.

(56) References Cited

U.S. PATENT DOCUMENTS

| | | | | |
|---|---|---|---|---|
| 2,321,452 A * | 6/1943 | Berger | ................... | D06C 5/005 223/76 |
| 3,616,893 A | 11/1971 | Knadle et al. | | |
| 3,770,148 A * | 11/1973 | Hendren | ................ | B65G 33/02 414/287 |
| 4,391,602 A * | 7/1983 | Stichnoth | ................ | D06F 73/02 223/51 |
| 5,320,873 A * | 6/1994 | McClain | ................ | D06M 11/61 427/255.24 |
| 5,459,301 A * | 10/1995 | Miller | .................. | H05B 6/6455 219/679 |
| 2006/0272178 A1* | 12/2006 | Frushtick | ................ | D06F 73/02 34/621 |
| 2008/0034609 A1* | 2/2008 | Wolf | ....................... | D06F 73/02 34/216 |
| 2015/0210482 A1* | 7/2015 | Sieksmeier | .......... | B65G 1/0457 700/230 |

FOREIGN PATENT DOCUMENTS

| | | |
|---|---|---|
| CN | 205062520 | 3/2016 |
| EP | 3 124 406 | 2/2017 |
| GB | 1 571377 | 7/1980 |
| JP | 2001-162099 | 6/2001 |
| KR | 10-0496925 | 6/2005 |

OTHER PUBLICATIONS

European Search Report dated Mar. 13, 2020 issued in Application No. 19201117.9.

* cited by examiner

*Primary Examiner* — Benjamin L Osterhout
(74) *Attorney, Agent, or Firm* — KED & Associates LLP

(57) ABSTRACT

A fabric treating apparatus including: a cabinet defining a treating chamber in which clothes is accommodated; a first conveyer and a second conveyer for conveying the clothes in one direction; a first fixing member to which the first conveyer is fixed, and which is rotatably installed in the cabinet; and a second fixing member to which the second conveyer is fixed, and which is rotatably installed in the cabinet.

20 Claims, 26 Drawing Sheets

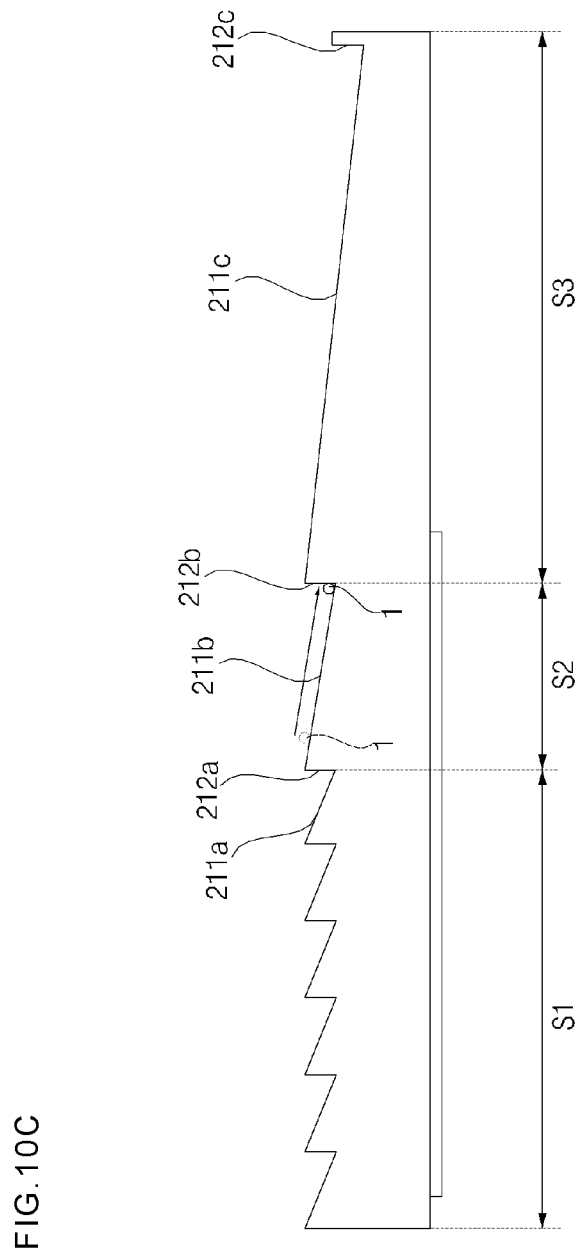

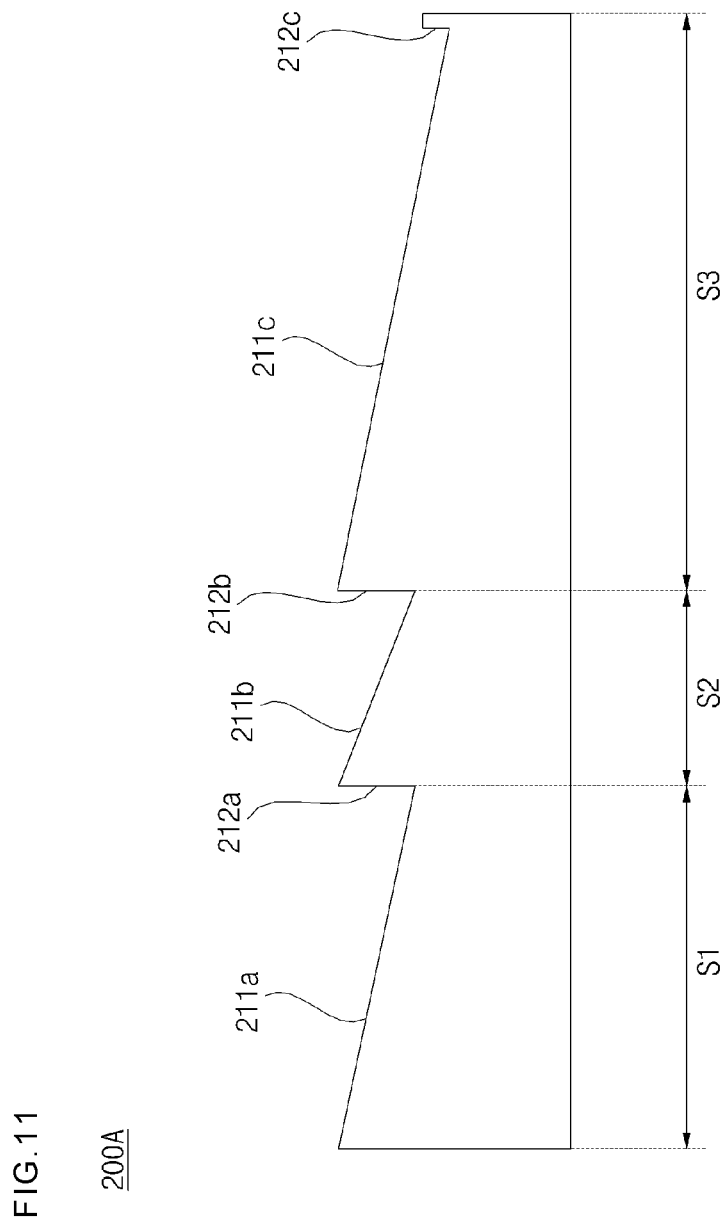

FABRIC TREATING APPARATUS

CROSS-REFERENCE TO RELATED APPLICATION

This application claims the benefit of Korean patent application no. 10-2018-0118052, filed on Oct. 4, 2018, which is hereby incorporated by reference as if fully set forth herein.

BACKGROUND OF THE INVENTION

1. Field of the Invention

The present invention relates to a fabric treating apparatus, and more particularly, to a fabric treating apparatus which can convey clothes to a treating chamber one by one with a simple structure, and is foldable when not in use.

2. Description of the Related Art

A fabric treating apparatus refers to all devices for managing or treating clothes such as washing, drying, or removing wrinkles of clothes in a home or a laundry. For example, a fabric treating apparatus may include a washing machine for washing clothes, a dryer for drying clothes, a washer-drier for both washing and drying functions, a refresher for refreshing clothes, a steamer for removing unnecessary wrinkles of clothes, and the like.

More specifically, the refresher is a device for making clothes more comfortable and fresh, and performs functions such as drying clothes, supplying fragrance to clothes, preventing the generation of static electricity of clothes, or removing wrinkles of clothes. A steamer is a device that removes wrinkles of clothes by simply supplying steam to the clothes. Unlike a general iron, the steamer can delicately remove wrinkles of the clothes as a hot plate does not touch the clothes.

The fabric treating apparatus having the functions of the refresher and the steamer may perform functions such as wrinkles and odor removal of the clothes stored therein by using steam and hot air. Due to this function, the clothes stored in clothes reproducing apparatus can remove the odor particles contaminating the clothes, or wrinkles to achieve an ironing effect.

Conventional fabric treating apparatus accommodates a plurality of clothes or a single clothes in a single large treating chamber, and removes wrinkles by applying hot air, steam, or mechanical force to the clothes. However, in order to treat a large number of clothes in succession, a clothes conveying device is required.

The conveying device of Korean Patent Publication No. 10-2003-0078295 has a complicated configuration such as an elevator 3 for conveying a hanger; a guide body 20 having a shape that allows the hanger to be hung and slid down, a plurality of cylinders 21, a plurality of blocking bars 22 to 24, a hanger hanging tool 10, a conveying line 6, a conveyor belt drive unit 7, and the like.

When the hanger hanging tool 10 passes in front of the blocking bar, in order to hang the hanger on the hanger hanging tool 10, a sensor for detecting the hanger should be installed on the blocking bar. In addition, when a first blocking bar 22 is lifted, a plurality of blocking bars 22 to 24 are installed in order to prevent the other hangers from descending together, so that it operates in a complicated sequence.

Therefore, the conventional clothes conveying device has a complicated structure so that it is difficult to manufacture, the manufacturing cost is increased, and it is very likely to cause a failure due to a complex structure.

In addition, there is a problem in that the fabric treating apparatus for treating a large amount of clothes in a continuous manner occupies a large space when not in use.

SUMMARY OF THE INVENTION

The present invention has been made in view of the above problems, and provides a fabric treating apparatus for sequentially and continuously treating a large number of clothes.

The present invention further provides a fabric treating apparatus that secures a space for treating a plurality of clothes when in use, and occupies less space when not in use.

The present invention further provides a fabric treating apparatus for sequentially conveying clothes to a treating chamber through a single drive device and then discharging them from the treating chamber.

The present invention further provides a conveying device and a fabric treating apparatus for sequentially conveying clothes to a treating chamber through a single drive device and then discharging them from the treating chamber.

The present invention further provides a conveying device and a fabric treating apparatus which have a simple and reliable structure by combining the shape of the upper surface of a frame and the shape of the upper surface of a lifter, and are easy to manufacture.

The present invention further provides a conveying device and a fabric treating apparatus which have a low height, a small occupied space, and a large clothes treating capacity, because a mover moving back and forth moves a lifter up and down.

In order to achieve the above object, two conveyers are rotatably coupled to a cabinet, so that, in a folded state, conveyers are positioned inside the cabinet, and in an unfolded state, a portion of the conveyer is exposed to the outside of the cabinet.

In detail, the fabric treating apparatus according to an aspect of the present invention includes: a cabinet defining a treating chamber in which clothes is accommodated; a first conveyer and a second conveyer for conveying the clothes in one direction; a first fixing member to which the first conveyer is fixed; a second fixing member to which the second conveyer is fixed; a guide block to which the first fixing member and the second fixing member are rotatably coupled; a guide rail in which the guide block is slid, and which is coupled to the cabinet; a first stay link having one end rotatably coupled to the first fixing member and the other end rotatably coupled to the cabinet; and a second stay link having one end rotatably coupled to the second fixing member and the other end rotatably coupled to the cabinet.

The guide rail, the first stay link, and the second stay link are coupled to an upper surface of the cabinet.

The guide rail is extended in a longitudinal direction of the cabinet.

One end of the guide rail is positioned adjacent to one end of the cabinet in the longitudinal direction, and the other end of the guide rail is positioned adjacent to a center of the cabinet in the longitudinal direction.

The fabric treating apparatus further includes a block hinge for connecting the guide block and each fixing member, and the block hinge is positioned adjacent to one end of each fixing member in the longitudinal direction.

The fabric treating apparatus further includes a stay hinge for connecting each stay link and the cabinet, and the stay hinge is disposed closer to an edge of the cabinet than the guide rail.

The fabric treating apparatus further includes a stay hinge for connecting each stay link and the cabinet, and the stay hinge is disposed closer to an edge of the cabinet than the block hinge.

Each stay link further includes a long hole to which each stay hinge is coupled, and the long hole is extended in the longitudinal direction of each stay link.

A position at which the stay link is coupled to each fixing member is positioned adjacent to a center in the longitudinal direction than a position at which the guide block is coupled.

The fabric treating apparatus further includes a first rotary link having one end rotatably coupled to the first fixing member and the other end rotatably coupled to the cabinet; and a second rotary link having one end rotatably coupled to the second fixing member and the other end rotatably coupled to the cabinet.

In addition, the fabric treating apparatus according to another aspect of the present invention includes: a cabinet defining a treating chamber in which clothes is accommodated; a first conveyer and a second conveyer for conveying the clothes in one direction; a first fixing member to which the first conveyer is fixed, and which is rotatably installed in the cabinet; and a second fixing member to which the second conveyer is fixed, and which is rotatably installed in the cabinet, wherein the first conveyer is converted to a first state of being positioned inside the treating chamber, and a second state in which a part of the first conveyer is exposed to the outside of the treating chamber, due to a rotation of the first fixing member, and the second conveyer is converted to a second state of being positioned inside the treating chamber, and a second state in which a part of the second conveyer is exposed to the outside of the treating chamber, due to a rotation of the second fixing member.

The first fixing member is rotated together with the second fixing member.

The fabric treating apparatus further includes: a guide block to which the first fixing member and the second fixing member are rotatably coupled; and a guide rail in which the guide block is slid.

The guide rail is extended in a longitudinal direction of the cabinet.

One end of the guide rail is positioned adjacent to one end of the cabinet in the longitudinal direction, and the other end of the guide rail is positioned adjacent to a center of the cabinet in the longitudinal direction.

The first conveyer and the second conveyer are disposed in parallel with a longitudinal direction of the cabinet in the first state, and the first conveyer and the second conveyer are disposed to intersect with the longitudinal direction of the cabinet in the second state.

The fabric treating apparatus further includes: a first stay link having one end rotatably coupled to the first fixing member and the other end rotatably coupled to the cabinet; and a second stay link having one end rotatably coupled to the second fixing member and the other end rotatably coupled to the cabinet.

Each stay link further comprises a long hole to which each stay hinge coupled to the cabinet is coupled, and the long hole is extended in the longitudinal direction of each stay link.

One surface of each fixing member defines a door for opening and closing the cabinet.

Each fixing member is installed on an upper surface of the cabinet, and the door opens and closes a side surface of the cabinet.

BRIEF DESCRIPTION OF THE DRAWINGS

The above and other objects, features and advantages of the present invention will be more apparent from the following detailed description in conjunction with the accompanying drawings, in which:

FIGS. 10A to 10C are an operation diagram illustrating the principle of conveying a conveyed object by the operation of a lifter of the present invention;

FIG. 11 is a conceptual diagram of a conveying device according to another embodiment of the present invention;

DETAILED DESCRIPTION OF THE PREFERRED EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention. As used herein, the singular form is intended to include the plural forms as well, unless the context clearly indicates otherwise. In the present application, it will be further understood that the terms "comprises", includes," etc. specify the presence of stated features, integers, steps, operations, elements, components, or combinations thereof, but do not preclude the presence or addition of one or more other features, integers, steps, operations, elements, components, or combinations thereof.

Hereinafter, the present invention will be described with reference to the drawings for explaining a fabric treating apparatus according to embodiments of the present invention.

Figure 1:
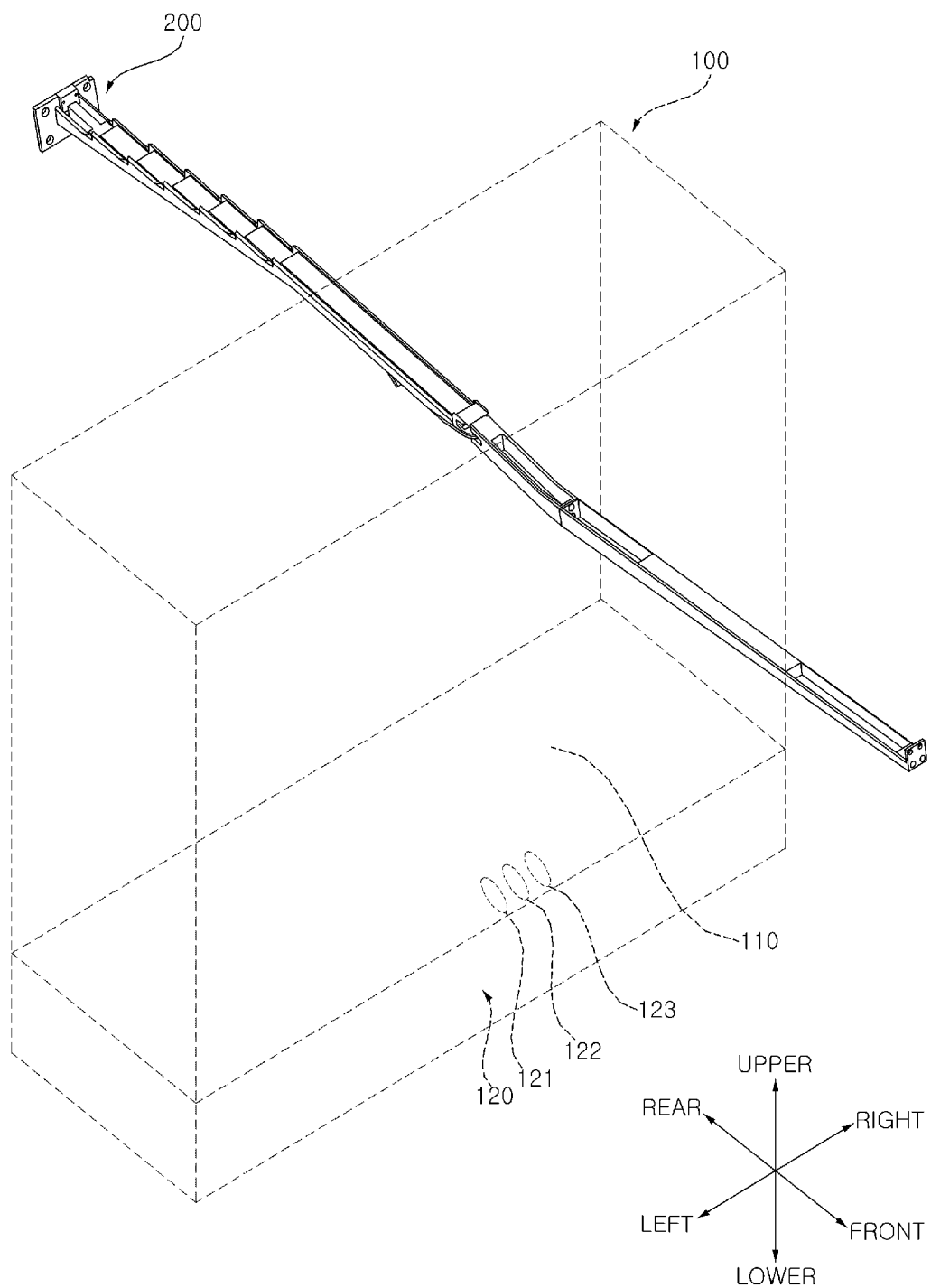
FIG. 1 is a perspective view of a fabric treating apparatus according to an embodiment of the present invention.

FIG. 1 is a perspective view of a fabric treating apparatus according to an embodiment of the present invention.

Referring to FIG. 1, a fabric treating apparatus 10 may include a treating chamber 110 in which clothes are accommodated, a heating unit 120 supplying at least one of hot air and steam into the treating chamber 110, and a conveying device 200 conveying clothes in one direction.

The treating chamber 110 may be formed in a cabinet 100.

The treating chamber 110 is a space for applying hot air or steam to clothes so as to change the physical or chemical properties of the clothes. That is, it is a space where clothes treating is performed in various manners such as drying clothes by applying hot air, spreading wrinkles on clothes by using steam, treating clothes to have a smell by spraying air fresheners, or preventing static electricity in clothes by spraying antistatic agent.

At least one surface of the treating chamber 110 is opened to allow clothes to enter and exit, and the opened surface is opened and closed by a door (not shown). The treating chamber 110 is isolated from the outside when the door is closed, and the treating chamber 110 is exposed to the outside when the door is opened.

In detail, the treating chamber 110 may have two opened surfaces facing each other. The door installed in the opened surface may be slid or rotated to open and close the treating chamber 110.

The heating unit 120 may be disposed below the treating chamber 110. The heating unit 120 sucks and heats the air inside the treating chamber 110 and blows hot air into the treating chamber 110, or generates steam by being supplied with water and applying heat to the water and discharges the generated steam into the treating chamber 110.

Obviously, the heating unit 120 may be implemented to supply hot air and steam together into the treating chamber 110, or may be implemented to selectively supply either hot air or steam. The heating unit 120 may be variously implemented by those skilled in the art to supply hot air and/or steam.

In one embodiment of the present invention, the heating unit 120 may include an air suction port 121 for sucking air inside the treating chamber 110, a heater (not shown) for heating the sucked air, a hot air discharge port 122 discharges the air heated by the heater into the treating chamber 110, and a steam spray port 123 for spraying steam into the treating chamber 110.

Hot air and/or steam generated by the heating unit 120 is applied to the clothes accommodated in the treating chamber 110 to affect the physical or chemical properties of the clothes. That is, the tissue structure of the clothes is relaxed by hot air or steam, so that wrinkles are spread, and an unpleasant odor is removed as odor molecules that are pervaded into clothing react with steam. In addition, the hot air and/or steam generated by the heating unit 120 has the effect of sterilizing the bacteria parasitic on the clothes.

The hot air supplied by the heating unit 120 retains moisture while drying the clothes stored in the treating chamber 110. The hot air containing moisture flows to the upper portion of the treating chamber 110, and is condensed as it meets the inner wall of the treating chamber 110. In particular, when steam is supplied into the treating chamber 110 by the heating unit 120, the condensation phenomenon on the inner wall of the treating chamber 110 becomes more severe. If the water condensed on the inner wall of the treating chamber 110 is left as it is after the operation of the fabric treating apparatus 10 is completed, odor may be generated and bacteria may breed to cause hygiene problems. The blowing fan (not shown) may circulate air inside the treating chamber 110, thereby preventing condensation from forming on the inner wall of the treating chamber 110, and maintaining a clean state inside the treating chamber 110.

The conveying device 200 that hangs and conveys a hanger (not shown) may be disposed in the upper portion of the treating chamber 110. The conveying device 200 sequentially conveys the hanger hung on the conveying device 200 in one direction, thereby conveying clothes in one direction.

Hereinafter, the conveying device 200 for conveying the clothes will be described in detail.

Figure 2:
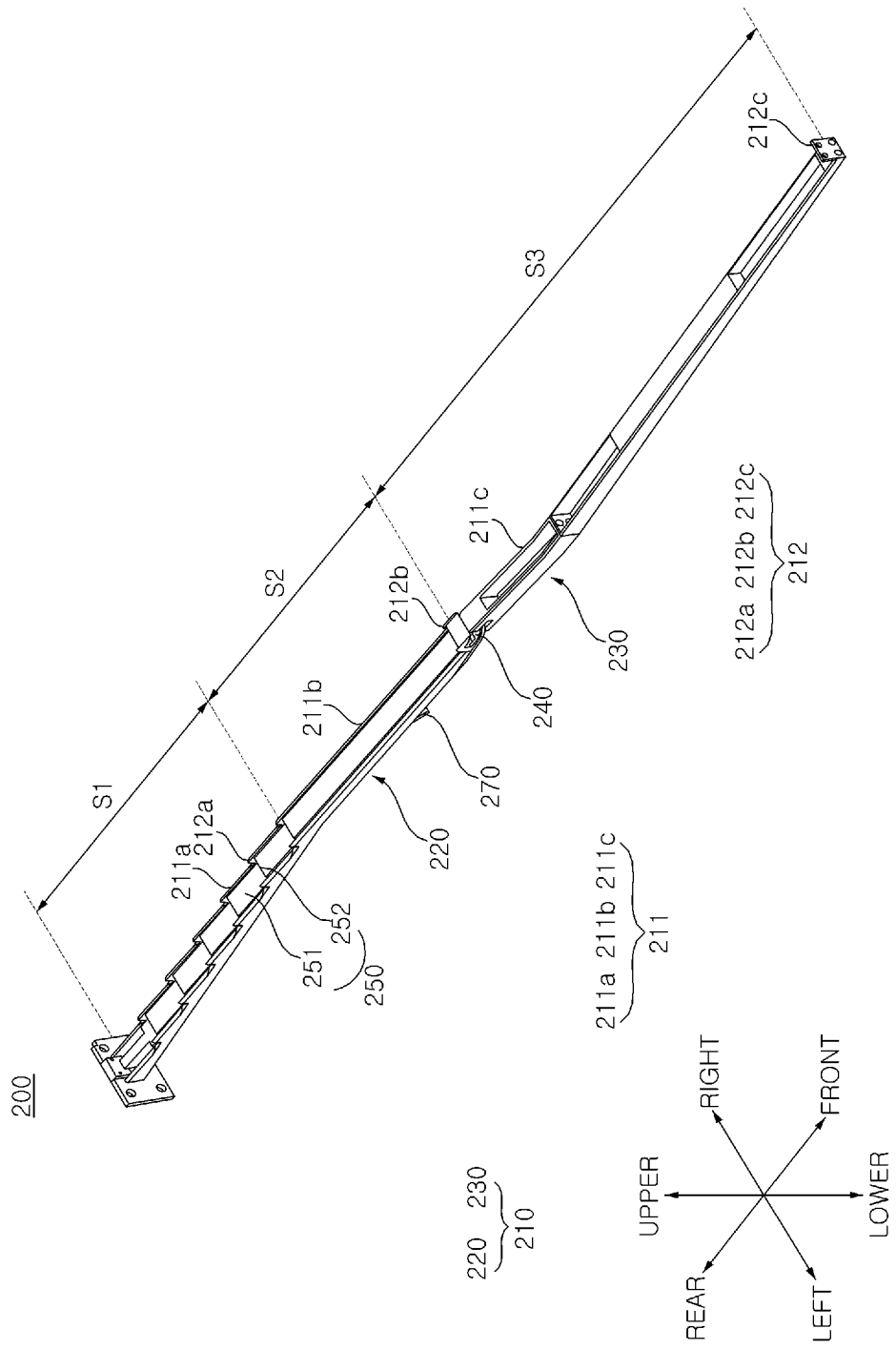
FIG. 2 is a perspective view of a conveying device according to an embodiment of the present invention.
Figure 3:
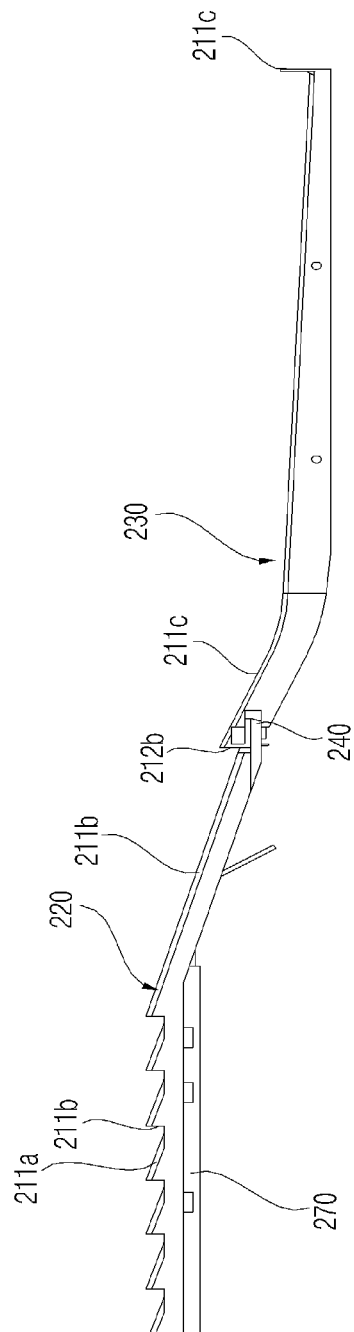
FIG. 3 is a front view of the conveying device of FIG. 2.
Figure 4:
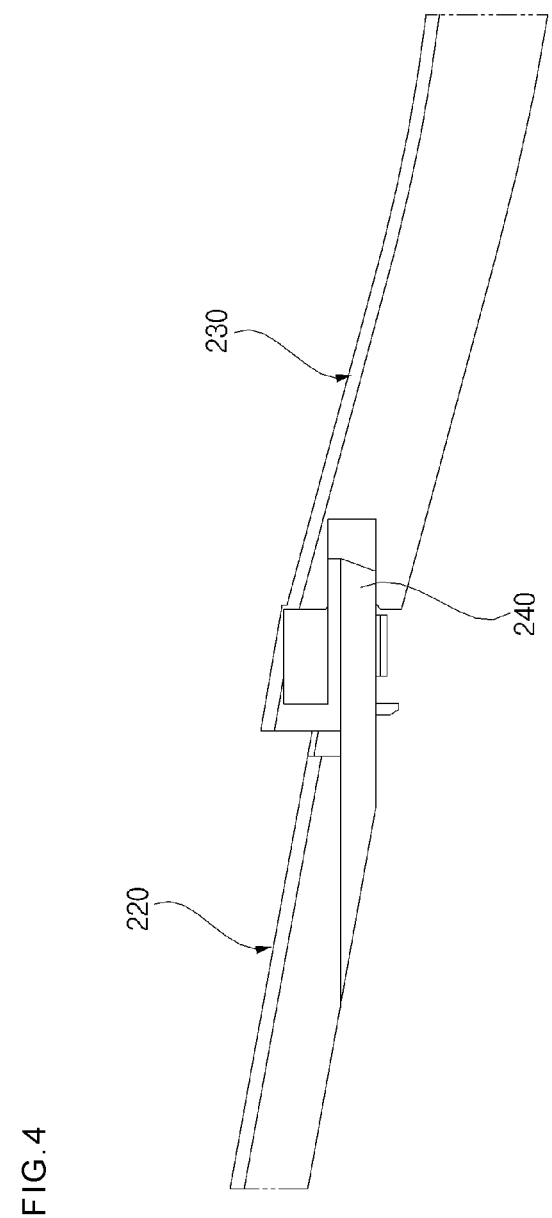
FIG. 4 is a diagram illustrating a connection portion between a first frame and a second frame of the conveying device of FIG. 2.

FIG. 2 is a perspective view of a conveying device according to an embodiment of the present invention, FIG. 3 is a front view of the conveying device of FIG. 2, and FIG. 4 is a diagram illustrating a connection portion between a first frame and a second frame of the conveying device of FIG. 2.

Referring to FIGS. 2 to 4, the conveying device 200 according to an embodiment of the present invention may include a frame 210, a lifter 250, and a drive unit.

The conveying device 200 allows the conveyed object 1 (hanger) hung on in the frame 210 to move in a horizontal direction due to an inclined plane structure of the upper surface of the frame 210 and the vertical movement of the lifter 250.

The frame 210 defines a space on which the clothes hung on the hanger is hung, and which accommodates the lifter 250. The frame 210 has a shape extended in one direction. For example, the frame 210 may be divided into a preparation area S1, a treating area S2, and a discharge area S3 along the length direction. Both ends of the frame 210 are the preparation area S1 and the discharge area S3, and the treating area S2 is positioned between the preparation area S1 and the discharge area S3.

The treating area S2 of the frame 210 may be positioned inside the treating chamber 110, the preparation area S1 of the frame 210 may be disposed in one side of the outside of the treating chamber 110, and the discharge area S3 of the frame 210 may be disposed in the other side of the outside of the treating chamber 110, The frame 210 may be formed in one configuration to have a structure that cannot be folded. However, in the present embodiment, the frame 210 may have a foldable structure, while having at least one hinge 240.

For example, the frame 210 may include a first frame 220, and a second frame 230 connected to one end of the first frame 220 by a hinge 240 to be rotatable. The first frame 220 and the second frame 230 are folded in the vertical direction as an axis. Therefore, when not used, the frame 210 may be folded and accommodated inside the treating chamber 110, and when used, both ends of the frame 210 may be exposed to the outside of the treating chamber 110.

The frame 210 may include at least two sliding surfaces 211 inclined downward in a first direction (toward the front from the rear), and at least two restraining surfaces 212 disposed between the two sliding surfaces 211 and defining a surface intersecting the sliding surfaces 211.

As a whole, the upper surface of the frame 210 may have a structure in which the sliding surface 211 and the restraining surface 212 are alternately disposed toward the front from the rear.

Each sliding surface 211 and restraining surface 212 define an upper surface of the frame 210. The sliding surface 211 is a surface on which the conveyed object 1 positioned on the sliding surface 211 is slid by its own weight.

The sliding surface 211 has an inclination that decreases as it progresses from the rear to the front. The sliding surface 211 preferably has an inclination to the extent that at least the conveyed object 1 positioned on the sliding surface 211 is slid by its own weight. Specifically, the inclination angle of the sliding surface 211 with respect to the first direction may be 20° to 70°.

At least a part of the sliding surface 211 may be parallel to the horizontal direction or may have a very small inclination angle. Specifically, the front end of the sliding surface 211 may be formed in parallel with the horizontal direction, thereby providing a space on which the conveyed object is hung.

The length or inclination angle of each sliding surface 211 may be different from each other or may be the same. In detail, the length of the sliding surface 211 formed in the preparation area S1 of the frame 210 may be smaller than the length of the sliding surface 211 formed in the treating area S2 of the frame 210 and the length of the sliding surface 211 formed in the discharge area S3 of the frame 210. In addition, the number of sliding surfaces 211 of the treatment area S2 or the discharge area S3 may be smaller than the number of sliding surfaces 211a of the preparation area S1. It is preferable that the number of the sliding surfaces 211b of the discharge area S3 and the treating area S2 is one, and the number of the sliding surfaces 211a of the preparation area S1 is between 5 and 10.

Therefore, by the length and number of the sliding surface 211, the number of clothes to be treated in the treatment area S2 can be adjusted, and the number of clothes to be prepared in the preparation area S1 can be adjusted.

The restraining surface 212 is disposed between two sliding surfaces 211 adjacent to each other, and defines a surface intersecting with the sliding surfaces 211 adjacent to each other. That is, the restraining surface 212 is a surface having an inclination with respect to the sliding surface 211 so that the conveyed object 1 is not able to be slid due to the inclination of the sliding surface 211 but is restrained to be positioned.

Each restraining surface 212 connects the sliding surfaces 211 adjacent to each other. Specifically, the lower end of each restraining surface 212 is connected to the lower end of one of the sliding surfaces 211 adjacent to each other, and the upper end of each restraining surface 212 is connected to the upper end of one of the sliding surfaces 211 adjacent to each other. More specifically, the lower end of the restraining surface 212 is connected to the front end of the sliding surface 211 positioned in the rear side of the restraining surface 212, and the upper end of the restraining surface 212 is connected to the rear end of the sliding surface 211 positioned in the front side of the restraining surface 212. Therefore, the upper surface of the frame 210 has a sawtooth shape by the restraining surface 212 and the sliding surface 211.

The restraining surface 212 may have an inclination inclined upward from the rear side toward the front side or may be extended in parallel to the vertical direction. If the inclination of the restraining surface 212 is too low, the conveyed object 1 cannot be restrained, so that the inclination angle of the restraining surface 212 with respect to the horizontal plane is preferably 30° to 100°. This is because, when the inclination angle of the restraining surface 212 exceeds 100°, the conveyed object 1 is difficult to be lifted by the lifter 250. The conveyed object 1 is restrained by a restraining area in which the rear end of the restraining surface 212 and the front end of the sliding surface 211 positioned in the rear the restraining surface 212 are connected.

Each of the sliding surfaces 211 is preferably disposed not to be overlapped with each other in the vertical direction. This is because, when the sliding surfaces 211 are overlapped with each other in the vertical direction, the movement of the conveyed object 1 becomes difficult when the lifter 250 is in operation.

The height or inclination angle of each restraining surface 212 may be different from each other or may be the same. Specifically, the height of the restraining surface 212 formed in the preparation area S1 of the frame 210 may be equal to the height of the restraining surface 212 formed in the treating area S2 of the frame 210 and the height formed in the discharge area S3 of the frame 210. In addition, the number of restraining surfaces 212 of the treating area S2 or the discharge area S3 may be smaller than the number of restraining surfaces 212a of the preparation area S1. It is preferable that the number of restraining surfaces 212b of the discharge area S3 and the treating area S2 is one, and the number of restraining surfaces 212a of the preparation area S1 is between five and ten.

Specifically, the preparation area S1 may include at least two sliding surfaces 211 and two restraining surfaces 212, the treating area S2 may include one sliding surface 211 and one restraining surface 212, and the discharge area S3 may include one sliding surface 211 and one restraining surface 212.

The first frame 220 may include the preparation area S1 and the treating area S2, and the second frame 230 may include the discharge area S3.

Hereinafter, the first frame 220 and a configuration coupled with the first frame 220 will be described in detail.

Figure 5:
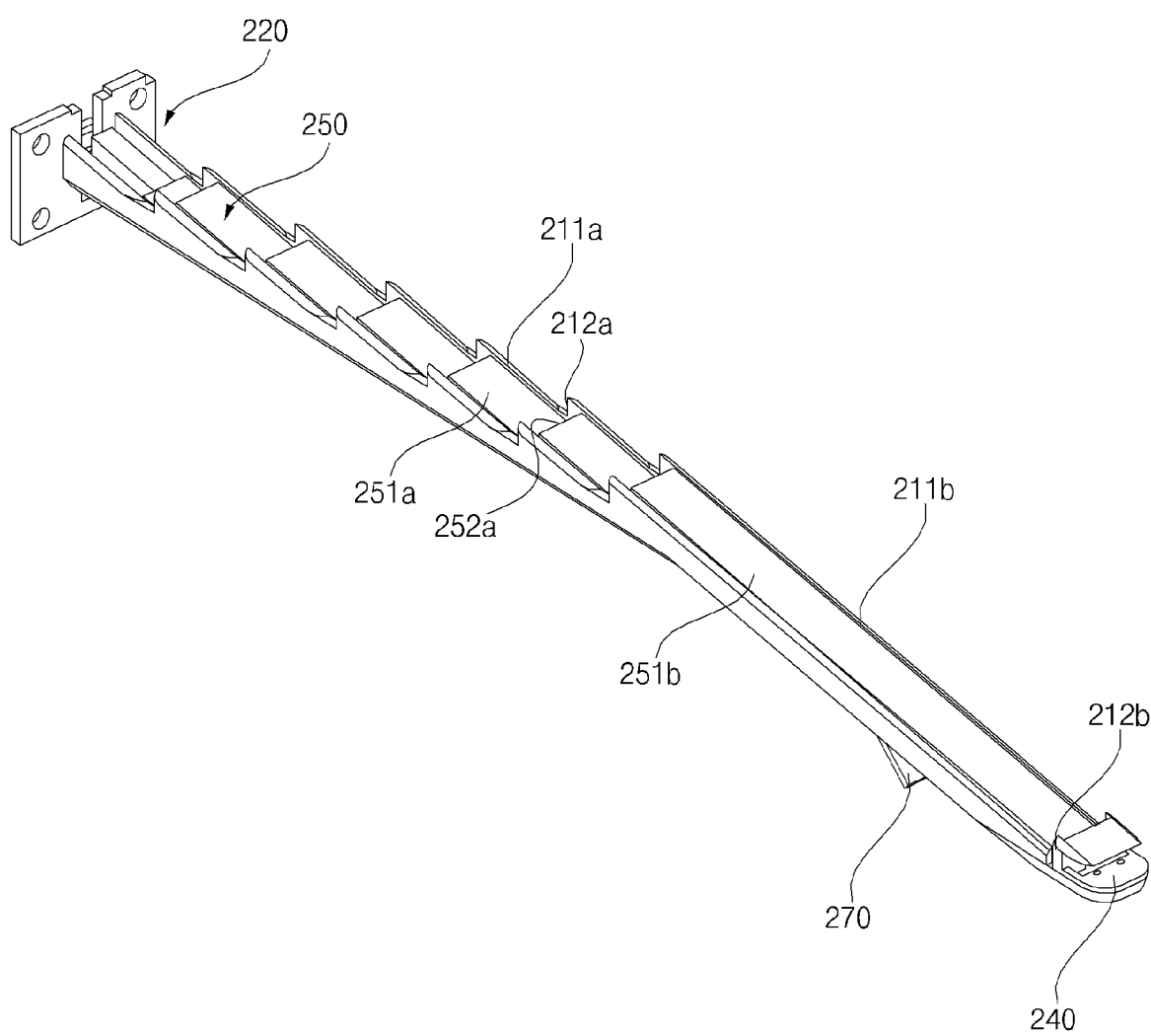
FIG. 5 is a perspective view of the first frame shown in FIG. 2 and a surrounding configuration.
Figure 6:
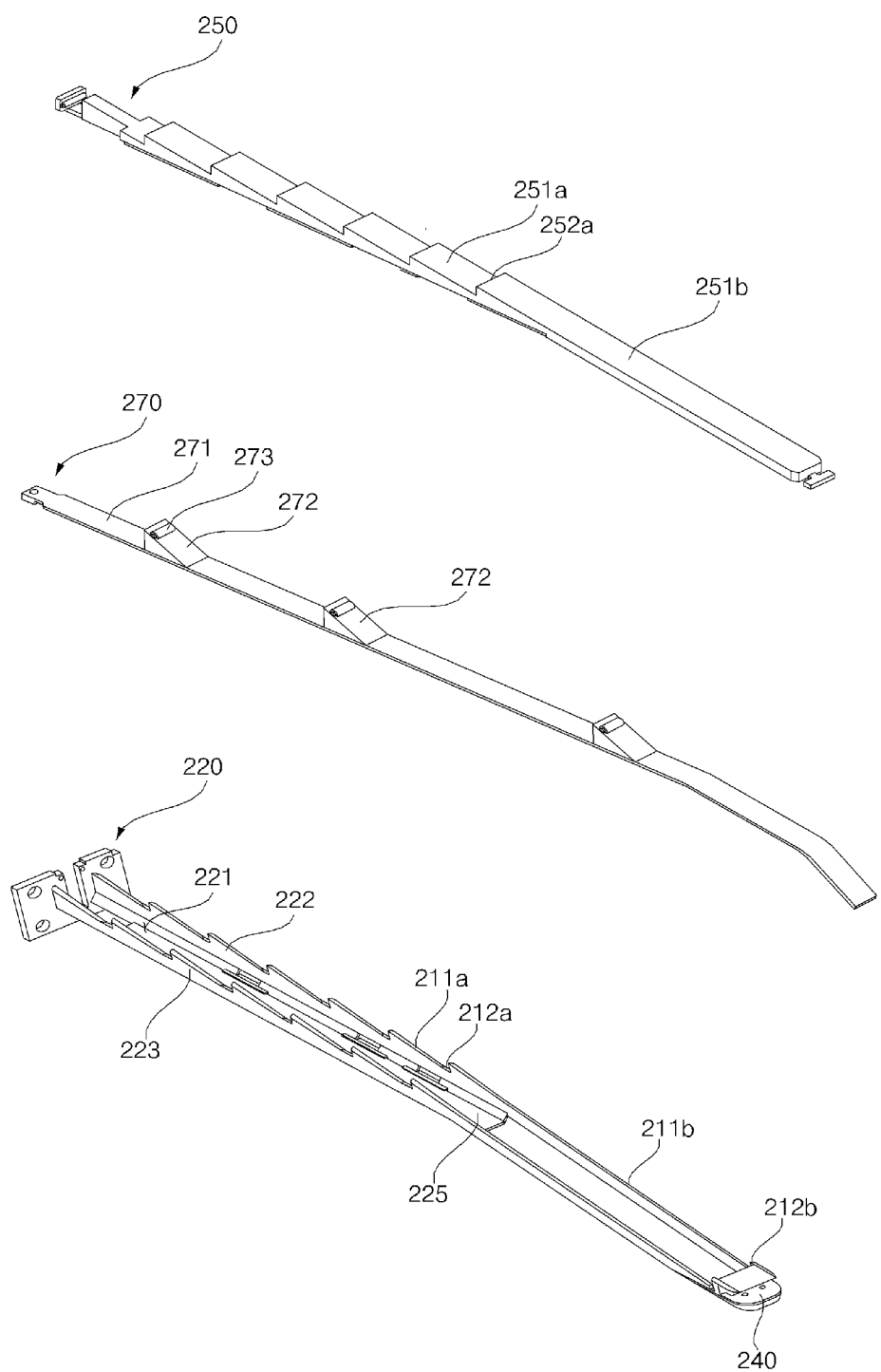
FIG. 6 is an exploded perspective view of the configuration shown in FIG. 5.
Figure 7:
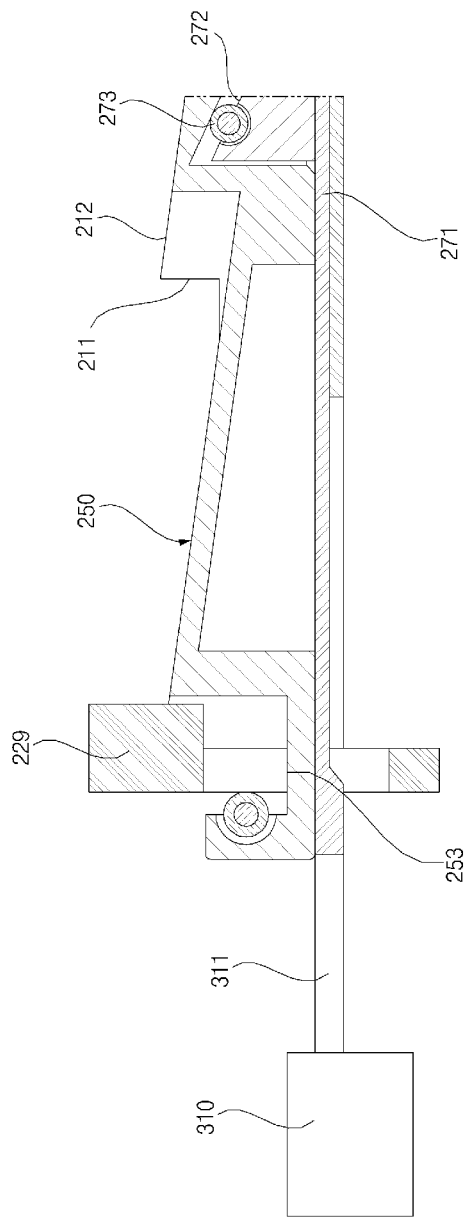
FIG. 7 is a partial cross-sectional view of a conveying device according to an embodiment of the present invention.
Figure 8:
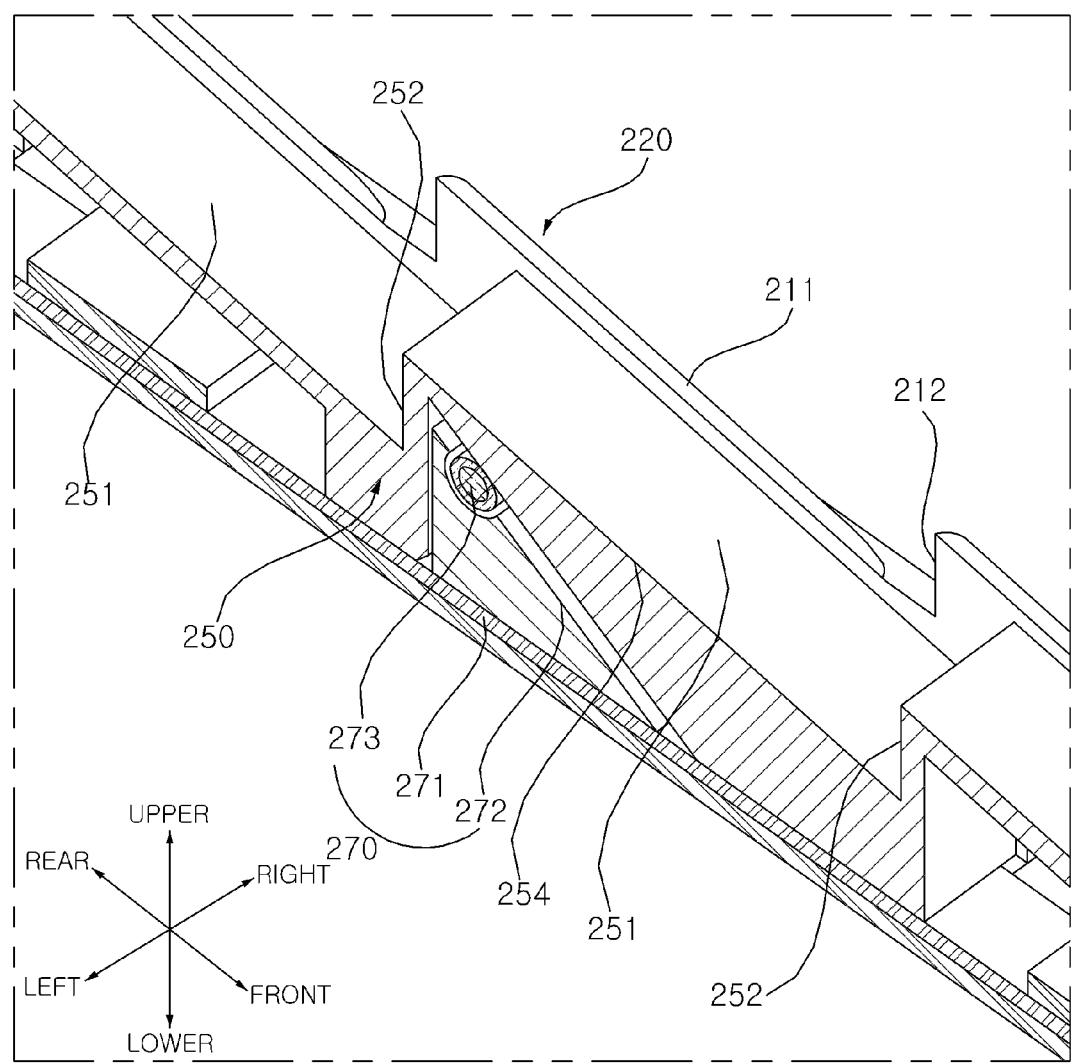
FIG. 8 is an operation diagram illustrating the operation of a conveying device according to an embodiment of the present invention.
Figure 9:
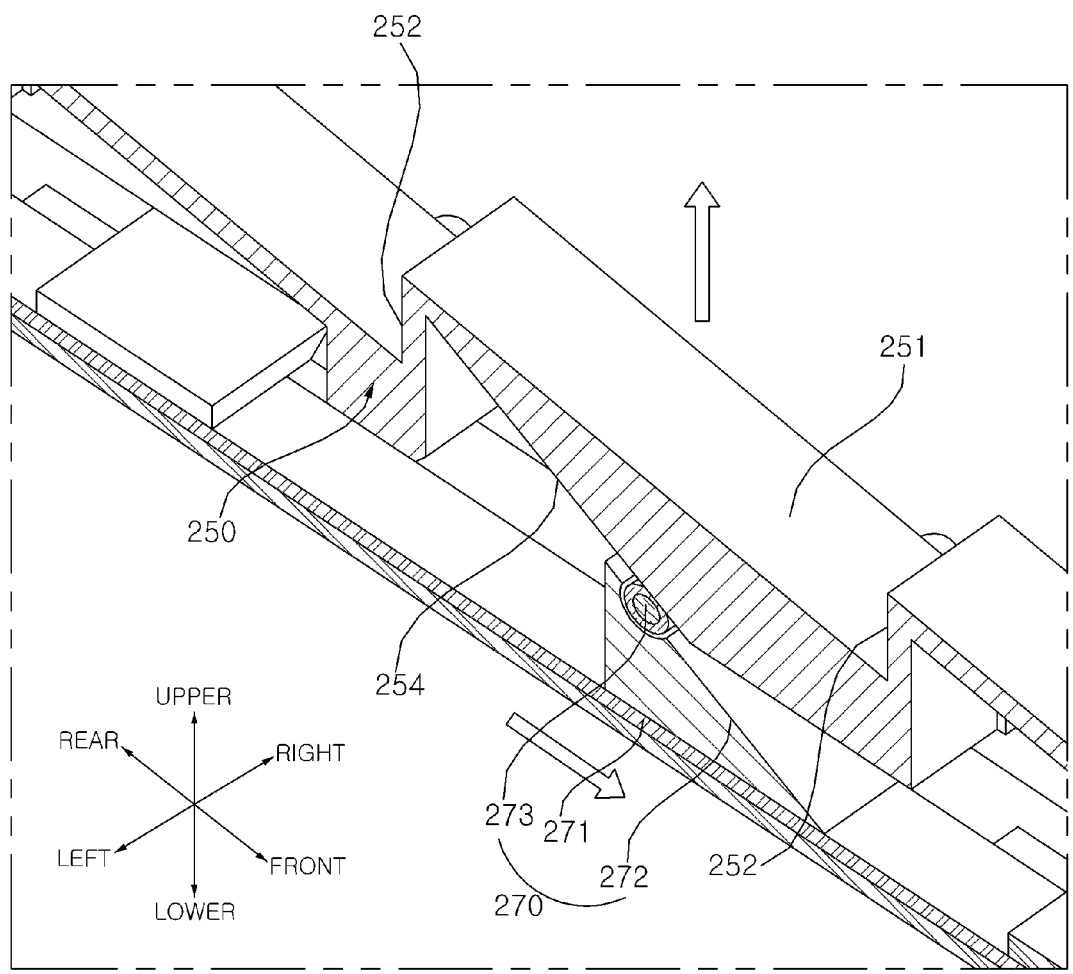
FIG. 9 is an operation diagram illustrating the operation of a conveying device according to an embodiment of the present invention.

FIG. 5 is a perspective view of the first frame shown in FIG. 2 and a surrounding configuration, FIG. 6 is an exploded perspective view of the configuration shown in FIG. 5, FIG. 7 is a partial cross-sectional view of a conveying device according to an embodiment of the present invention, FIG. 8 is an operation diagram showing the operation of a conveying device according to an embodiment of the present invention, and FIG. 9 is an operation diagram showing the operation of a conveying device according to an embodiment of the present invention.

Referring to FIGS. 5 to 9, the first frame 220 may have a structure in which the lifter 250 and a mover 270 described later are accommodated and the sliding surface 211 and the restraining surface 212 are formed on an upper surface thereof.

For example, the first frame 220 may include a first member 222 and a second member 223 that are disposed to be spaced apart and face each other, and extended in a front-rear direction, and a third member 225 that connects between the first member 222 and the second member 223.

A channel 221 for accommodating the lifter 250 and the mover 270 is formed between the first member 222 and the second member 223. The channel 221 may be opened in the front-rear direction and the upper direction. A linear motor 310 described later is connected through the rear of the channel 221. Due to a structure in which the lifter 250 and the mover 270 are accommodated in the channel 221, the conveying device 200 may be manufactured to be slim.

The sliding surface 211a and the restraining surface 212a of the preparation area S1 may be formed on the upper surface of the first member 222 and the second member 223. In addition, the sliding surface 211b and the restraining surface 212b of the treating area S2 may be formed on the upper surface of the first member 222 and the second member 223. A hinge 240 may be positioned in the front end of the first member 222 and the second member 223.

The lifter 250 may be provided in each of the plurality of frames 210, or a single lifter 250 may be provided in the plurality of frames 210. In the present embodiment, in order to reduce the manufacturing cost, the lifter 250 may be provided with a single lifter 250 in the first frame 220. That is, the lifter 250 may be disposed in the preparation area S1 and the treating area S2 of the first frame 220.

When the conveyed object 1 lifted from the treatment area S2 by the lifter 250 is positioned in the sliding surface 211 of the discharge area S3, the conveyed object 1 is conveyed by itself to the front end of the discharge area S3 by its own weight. In the discharge area S3, the lifter 250 may not be disposed.

The lifter 250 may have a structure of moving the conveyed object 1 positioned in the restraining area onto the sliding surface 211 of a next stage. Here, the sliding surface 211 of the next stage is a sliding surface 211 connected to the front end of the restraining surface 212 as a reference, and the sliding surface 211 of a previous stage may be defined as a sliding surface 211 connected to the rear end of the restraining surface 212 as a reference.

The lifter 250 is accommodated in the channel 221 of the first frame 220, so that the front-rear movement is restrained and the vertical movement is restrained. In addition, the frame 210 may be provided with a stopper 229 that restrains the movement of the lifter 250 in the upper direction. The lower limit of the lifter 250 is defined by the third member 225, and the upper limit of the lifter 250 is defined by the stopper 229. Obviously, the lifter 250 may be provided with a stop groove 253 coupled to the stopper 229.

For example, the lifter 250 may include at least two inclined surfaces 251 inclined downward in a first direction, and at least two intersecting surfaces 252 disposed between the two inclined surfaces 251 and defining a surface intersecting the inclined surfaces 251.

As a whole, the upper surface of the lifter 250 may have a structure in which the inclined surface 251 and the intersecting surface 252 are alternately disposed from the rear to the front.

Each inclined surface 251 and the intersecting surface 252 define an upper surface of the lifter 250. The inclined surface 251 is a surface on which the conveyed object 1 positioned on the inclined surface 251 is slid by its own weight.

The inclined surface 251 has an inclination that decreases as it progresses from the rear to the front. The inclined surface 251 preferably has an inclination such that at least the conveyed object 1 positioned on the inclined surface 251 is slid by its own weight. Specifically, the inclination angle of the inclined surface 251 with respect to the first direction may be 20° to 70°.

The length or inclination angle of each inclined surface 251 may be different from each other or may be the same. The lifter 250 may be divided into the preparation area S1 and the treating area S2. The length of the inclined surface 251a of the preparation area S1 may be smaller than the length of the inclined surface 251b of the treating area S2. In addition, the number of the inclined surface 251b of the treating area S2 may be smaller than the number of the inclined surface 251a of the preparation area S1. It is preferable that the number of the inclined surfaces 251b of the treating area S2 is one, and the number of the inclined surface 251a of the preparation area S1 is between five and ten. More preferably, the inclined surface 251a of the preparation area S1 of the lifter 250 has the number corresponding to the number of sliding surface 211a of the preparation area S1 of the frame 210, and the inclined surface 251b of the treating area S2 of the lifter 250 has the number corresponding to the number of sliding surface 211b of the treating area S2 of the frame 210.

The intersecting surface 252 is disposed between two inclined surfaces 251 adjacent to each other, and defines a surface intersecting with the inclined surfaces 251 adjacent to each other. That is, the intersecting surface 252 is a surface having an inclination with respect to the inclined surface 251 so that the conveyed object 1 cannot be slid but is restrained and positioned due to the inclination of the inclined surface 251.

Each intersecting surface 252 connects the inclined surfaces 251 adjacent to each other. Specifically, the lower end of each intersecting surface 252 is connected to the lower end of one of the inclined surfaces 251 adjacent to each other, and the upper end of each intersecting surface 252 is connected to the upper end of one of the inclined surfaces 251 adjacent to each other. More specifically, the lower end of the intersecting surface 252 is connected to the front end of the inclined surface 251 positioned in the rear side of the intersecting surface 252, and the upper end of the intersecting surface 252 is connected to the rear end of the inclined surface 251 positioned in the front side of the intersecting surface 252. Accordingly, the upper surface of the lifter 250 is serrated by the intersecting surface 252 and the inclined surface 251.

The intersecting surface 252 may have an inclination inclined upward from the rear side toward the front side, or may be extended in parallel to the vertical direction. If the inclination of the intersecting surface 252 is too low, the conveyed object 1 cannot be restrained, so that the inclination angle of the intersecting surface 252 with respect to the horizontal plane is preferably 30° to 100°.

Each of the inclined surfaces 251 is preferably disposed not to be overlapped with each other in the vertical direction. This is because when the inclined surfaces 251 are overlapped with each other in the vertical direction, the movement of the conveyed object 1 becomes difficult when the lifter 250 is in operation.

The height or inclination angle of each intersecting surface 252 may be different from each other or may be the same. In detail, the height of the intersecting surface 252 of the preparation area S1 may be equal to the height of the intersecting surface 252 of the treating area S2. In addition, the number of the intersecting surfaces 252 of the treating area S2 may be smaller than the number of intersecting surfaces 252 of the preparation area S1. It is preferable that the number of the intersecting surfaces 252 of the treating area S2 is one, and the number of the intersecting surfaces 252 of the preparation area S1 is between five and ten.

Specifically, the preparation area S1 may include at least two inclined surfaces 251 and two intersecting surfaces 252, and the treating area S2 may include one inclined surface 251 and one intersecting surface 252.

The number of sliding surfaces 211 may be the same as the number of inclined surfaces 251. Preferably, the number of the inclined surface 251 and the intersecting surface 252 formed in the preparation area S1 of the lifter 250 corresponds to the number of the sliding surface 211 and the restraining surface 212 formed in the preparation area S1 of the frame 210.

The length of each sliding surface 211 may be the same as the length of each inclined surface 251. Preferably, the length of the inclined surface 251 formed in the preparation area S1 of the lifter 250 may be the same as the length of the sliding surface 211 formed in the preparation area S1 of the frame 210, and the length of the inclined surface 251 formed in the treating area S2 of the lifter 250 may be the same as the length of the sliding surface 211 formed in the treating area S2 of the frame 210.

The lifter 250 may be provided with a guide surface 254 for guiding the movement of the mover 270 described later. The guide surface 254 moves the lifter 250 in the vertical direction by the movement of the mover 270 reciprocating in the front-rear direction.

In detail, the guide surface 254 may be inclined downward as it progresses from the rear side to the front side. The guide surface 254 may include a straight or curved line. The guide surface 254 may form a lower surface of the lifter 250. The guide surface 254 moves the lifter 250 in the vertical direction by a relative movement with the mover 270.

Each of the intersecting surfaces 252 and the respective sliding surfaces 211 may have a disposition for moving the conveyed object 1 to the sliding surface 211 of a next stage, when the lifter 250 is moved upward. For example, each intersecting surface 252 is disposed on an arbitrary line parallel to each sliding surface 211 in a vertical direction. That is, each intersecting surface 252 is disposed on the same line parallel to each sliding surface 211 in the vertical direction. In the front-rear direction, each intersecting surface 252 is disposed between each sliding surface 211.

Specifically, the restraining surface 212 of the frame 210 and the intersecting surface 252 of the lifter 250 are alternately disposed in the front-rear direction, and the sliding surface 211 of the frame 210 and the inclined surface 251 of the lifter 250 may be alternately disposed in the front-rear direction. More specifically, the restraining surface 212 of the frame 210 is disposed in the front end, and the restraining surface 212 and the intersecting surface 252 are alternately disposed from the front side to the rear side.

More specifically, each intersecting surface 252 is disposed on an arbitrary line parallel to each sliding surface 211 in the vertical direction, and each restraining surface 212 is disposed on an arbitrary line parallel to the inclined surface 251 in the vertical direction.

The drive unit moves the lifter 250 in the vertical direction intersecting the first direction (front-rear direction). The drive unit may have the number corresponding to the number of frames 210, whereas a plurality of frames 210 may be provided and a single drive unit may be provided.

The drive unit may have a structure for moving the lifter 250 in the vertical direction by the driving force of the drive motor. For example, the drive unit may be a linear motor 310 reciprocating in the vertical direction. However, when the drive unit is installed to move in the vertical direction, the height of the conveying device 200 becomes too large.

As another example, the drive unit may include a linear motor 310 linearly moving in the first direction, and a mover 270 for vertically moving the lifter 250 by reciprocating in the first direction by the linear motor 310.

The linear motor 310 is disposed in the rear side of the frame 210. The linear motor 310 includes a cylinder 311 reciprocating in the front-rear direction. The cylinder 311 of the linear motor 310 is connected to the rear end of the mover 270.

The mover 270 converts the front-rear movement of the linear motor 310 into a vertical movement. Specifically, the mover 270 may include at least one moving surface 272 inclined downward in the first direction and a moving body 271 in which the moving surface 272 is disposed.

The moving body 271 is extended long in the front-rear direction, and has a length corresponding to at least the first frame 220. Preferably, at least two moving surfaces 272 are spaced apart from each other. The moving surface 272 is disposed to be inclined downward in the first direction, so that when the mover 270 moves forward by interacting with the guide surface 254 formed in the lifter 250, the lifter 250 is moved upward.

The guide surface 254 of the lifter 250 may be in contact with at least part of the moving surface 272. The guide surface 254 and the moving surface 272 may slide with each other. A roller for reducing contact between the moving surface 272 and the guide surface 254 may be further included to reduce the frictional force. The roller may allow the guide surface 254 and the moving surface 272 to be spaced apart to reduce friction. The roller is installed on the moving surface 272 to be rotatable.

The mover 270 is accommodated in the channel 221 of the frame 210. The mover 270 is accommodated in such manner that the vertical movement is restrained inside the channel 221, and the movement in the front-rear direction is possible.

In particular, with reference to FIGS. 8 and 9, the conveyed object 1 is initially positioned in a restraining area in contact with the restraining surface 212. At this time, the upper surface of the lifter 250 is positioned below the upper surface of the frame 210.

When the mover 270 moves forward so as to move the conveyed object 1 to the next stage, the lifter 250 moves upward by the interaction of the moving surface 272 and the guide surface 254. The conveyed object 1 is moved upward along the restraining surface 212 by the inclined surface 251 of the lifter 250. When the inclined surface 251 of the lifter 250 is positioned higher than the restraining surface 212, the conveyed object 1 slides forward along the inclination of the inclined surface 251 of the lifter 250, and is restrained to the intersecting surface 252 of the lifter 250. Then, when the lifter 250 is lowered and the upper surface of the lifter 250 is positioned below the upper surface of the frame 210, the conveyed object 1 restrained to the intersecting surface 252 of the lifter 250 is positioned on the sliding surface 211 of the next stage, and slid forward along the inclination of the sliding surface 211 of the next stage and is positioned in contact with the restraining surface 212 of the next stage.

Accordingly, the conveyed object 1 is lifted by the lifter 250 from one sliding surface 211, and slides on the upper surface of the lifter, and then is conveyed to the sliding surface 211 of the next stage.

Hereinafter, the operation of the conveying device 200 will be described in more detail.

Figure 10A:
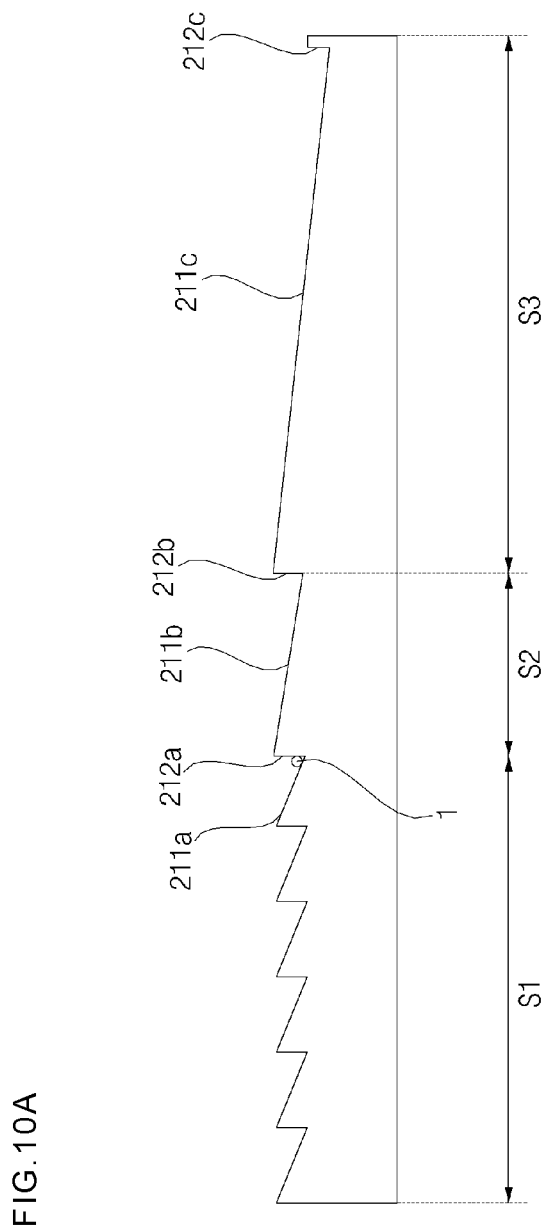
Figure 10B:
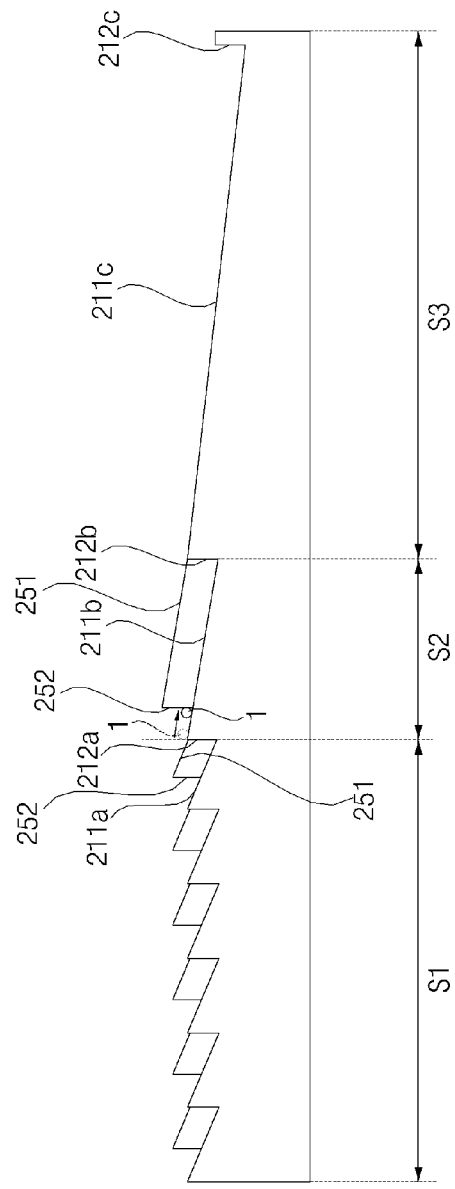

FIGS. 10A to 10C are an operation diagram showing the principle of conveying a conveyed object by the operation of a lifter of the present invention.

Referring to FIG. 10A, the conveyed object 1 is positioned in the restraining area which is in contact with the restraining surface 212 of the distal end of the preparation area S1. At this time, the upper surface of the lifter 250 is positioned below the upper surface of the frame 210.

Referring to FIG. 10B, when the mover 270 moves forward so as to move the conveyed object 1 to the next stage, the lifter 250 is moved upward by the interaction of the moving surface 272 and the guide surface 254. The conveyed object 1 is moved upward along the restraining surface 212 by the inclined surface 251 of the distal end of the preparation area S1 of the lifter 250. When the inclined surface 251 of the lifter 250 is positioned higher than the restraining surface 212, the conveyed object 1 slides forward along the inclination of the inclined surface 251 of the lifter 250, and is restrained to the intersecting surface 252 of the distal end of the preparation area S1.

Referring to FIG. 10C, when the lifter 250 is lowered and the upper surface of the lifter 250 is positioned below the upper surface of the frame 210, the conveyed object 1 restrained by the intersecting surface 252 of the preparation area S1 of the lifter 250 is positioned on the sliding surface 211b of the treating area S2 of the frame 210, slides forward along the inclination of the sliding surface 211b of the treating area S2, and is positioned in contact with the restraining surface 212b of the treating area S2. Obviously, the other conveyed objects 1 positioned in the preparation area S1 is also conveyed forward stage by stage.

FIG. 11 is a conceptual diagram of a conveying device 200A according to another embodiment of the present invention.

Referring to FIG. 11, in comparison with the conveying device 200 of FIGS. 2 to 9, the conveying device 200A according to another embodiment may have a difference in the configuration of the preparation area S1 and the structure of the frame 210. Hereinafter, the differences from the embodiment of FIGS. 2 to 9 will be mainly described, and unless otherwise described, the configuration is the same as the embodiment of FIGS. 2 to 9.

As another example, the frame 210 may have a structure that is not folded in the middle. The preparation area S1 of another embodiment may include one sliding surface 211 and one restraining surface 212, and may have one inclined surface 251 and one intersecting surface 252. When a plurality of conveyed objects 1 are hung on the preparation area S1, the conveyed object 1 is slid by its own weight and is biased toward the front end of the preparation area S1.

When the plurality of conveyed objects 1 are hung on a preparation space, the lifter 250 may have a structure for conveying a single conveyed object 1 into a treating space. For example, the position of the intersecting surface 252 of the preparation area S1 disposed on the same line in the vertical direction as the restraining surface 212 of the preparation space is disposed to be spaced apart from the rear surface is spaced apart rearward from the restraining surface 212 of the preparation space by a first distance, and the first distance may correspond to the width of a single conveyed object.

Figure 12:
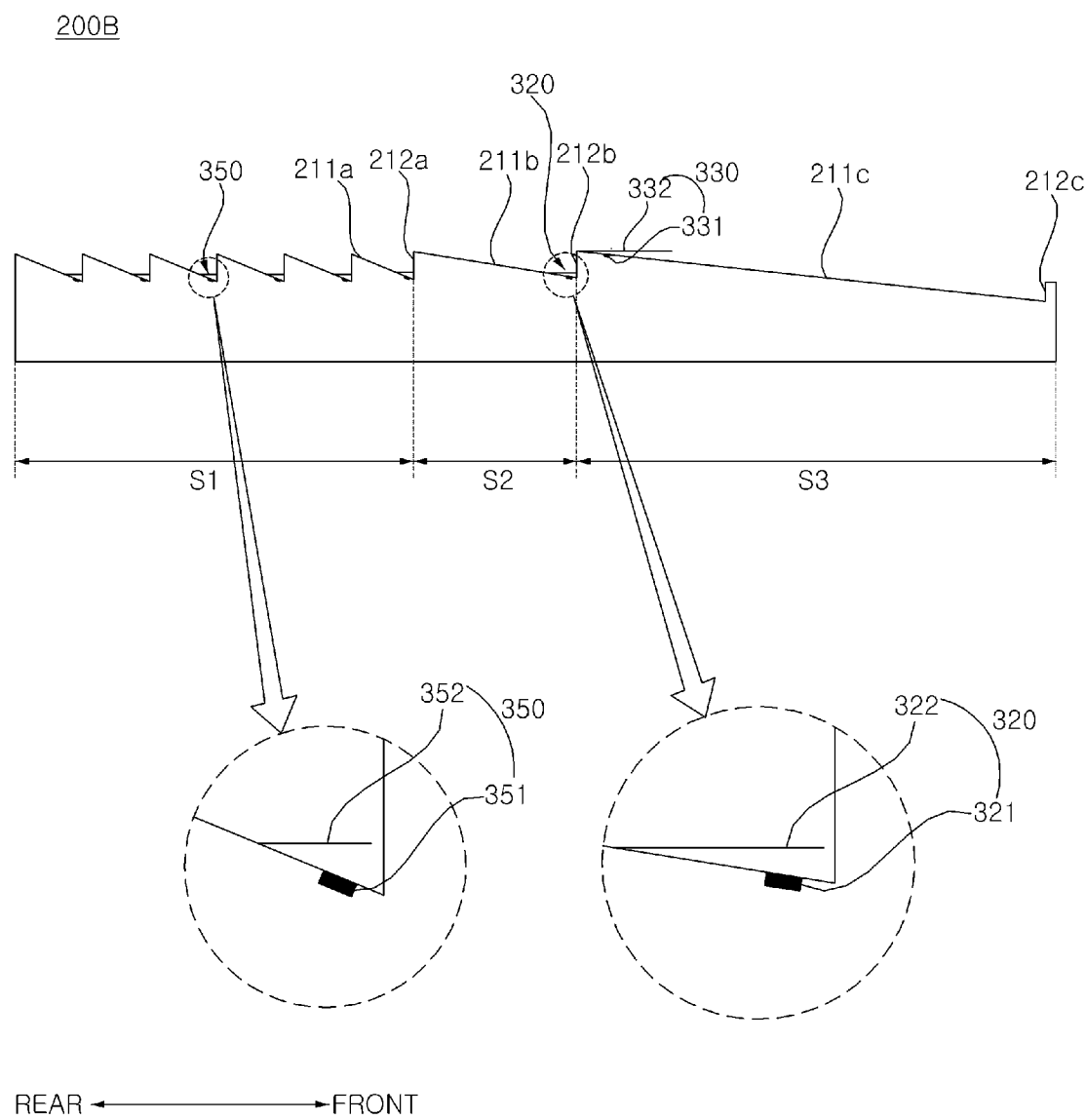
FIG. 12 is a conceptual diagram of a conveying device according to still another embodiment of the present invention.

FIG. 12 is a conceptual diagram of a conveying device according to still another embodiment of the present invention.

Referring to FIG. 12, the embodiment of FIG. 12 may further include a conveyed object sensor, in comparison with the embodiment of FIG. 10. Hereinafter, a difference with the embodiment of FIG. 10 will be described mainly and a configuration without special description is regarded as the same as the embodiment of FIG. 10.

The conveyed object sensor detects a conveyed object positioned on the frame 210 and transmits to a control unit 340. The conveyed object sensor may be disposed in at least one of a preparation area S1, a treating area S2, and a discharge area S3. The conveyed object sensor may be disposed in at least one of the sliding surfaces 211.

The conveyed object sensor may include at least one of a distance sensor, an optical sensor, and a switch sensor. Preferably, the conveyed object sensor may include the switch sensor to improve reliability.

For example, the conveyed object sensor may include a preparation area conveyed object sensor 350 disposed in the preparation area S1, a treating area conveyed object sensor 320 disposed in the treating area S2, and a discharge area conveyed object sensor 330 disposed in the discharge area S3.

The preparation area conveyed object sensor 350 detects a conveyed object hung on each of the restraining area of the preparation area S1, and transmits the detected information to the control unit 340. A single conveyed object sensor of the preparation area S1 may be disposed in the sliding surface 211 adjacent to the treating area S2, or may be disposed in each sliding surface 211, 211a of the preparation area S1.

The preparation area conveyed object sensor 350 is positioned in the front end of each sliding surface 211 of the preparation area S1. This is because the conveyed object is hung on the front end of the sliding surface 211 of the preparation area (S1). In detail, the preparation area conveyed object sensor 350 may include a switch terminal 351 and a switch lever 352.

The switch terminal 351 of the preparation area S1 is turned on when it comes into contact with the switch lever 352 of the preparation area S1 to transmit a signal to the control unit 340. The switch terminal 351 of the preparation area S1 is positioned in the front end of the sliding surface 211.

The switch lever 352 of the preparation area S1 is extended forward, and the rear end is rotatably installed in the sliding surface 211. The switch lever 352 of the preparation area S1 is disposed to overlap with the switch terminal 351 of the preparation area S1 in the vertical direction. The front end of the switch lever 352 of the preparation area S1 is positioned adjacent to the front end of each sliding surface 211.

The treating area conveyed object sensor 320 detects the conveyed object hung on each restraining area of the treating area S2, and transmits detected information to the control unit 340.

The treating area conveyed object sensor 320 is positioned in the front end of each of the sliding surfaces 211 and 211b of the treating area S2. This is because the conveyed object is hung on the front end of the sliding surface 211 of the treating area S2.

In detail, the treating area conveyed object sensor 320 may include a switch terminal 321 and a switch lever 322. The switch terminal 321 of the treating area S2 is turned on when it comes into contact with the switch lever 322 of the treating area S2, and may transmit a signal to the control unit 340. The switch terminal 321 of the treating area S2 is positioned in the front end of the sliding surface 211.

The switch lever 322 of the treating area S2 is extended forward, and the rear end is rotatably installed in the sliding surface 211. The switch lever 322 of the treating area S2 is disposed to overlap with the switch terminal 321 of the treating area S2 in the vertical direction. The front end of the switch lever 322 in the treating area S2 is positioned adjacent to the front end of each sliding surface 211.

The discharge area conveyed object sensor 330 detects the conveyed object that is hung on the restraining area of the discharge area S3 and transmits detected information to the control unit 340. When the conveyed object is accumulated in the discharge area S3 and a loading space for the conveyed object is insufficient in the discharge area S3, this information is transmitted to the control unit 340.

The discharge area conveyed object sensor 330 is positioned in the rear end of the sliding surface 211 of the discharge area S3. This is because the conveyed object is accumulated sequentially from the front end of the sliding surface 211 of the discharge area S3. That is, in the case where there is no loading space in the discharge area S3 after the conveyed objects are accumulated sequentially from the front end of the sliding surface 211 of the discharge area S3 to the rear side, the conveyed object is hung on the rear end of the sliding surface 211 of the discharge area S3. When the conveyed object is hung on the rear end of the sliding surface 211 of the discharge area S3, it is detected by the discharge area conveyed object sensor 330.

In detail, the discharge area conveyed object sensor 330 may include a switch terminal 331 and a switch lever 332. The switch terminal 331 of the discharge area S3 is turned on when it comes into contact with the switch lever 332 of the discharge area S3, and may transmit a signal to the control unit 340. The switch terminal 331 of the discharge area S3 is positioned adjacent to the rear end of the sliding surface 211.

The switch lever 332 of the discharge area S3 is extended forward, and the rear end is rotatably installed in the rear end of the sliding surface 211 of the discharge area S3. The switch lever 332 of the discharge area S3 is disposed to overlap with the switch terminal 331 of the discharge area S3 in the vertical direction. The front end of the switch lever 332 of the discharge area S3 is positioned to be spaced forward from the rear end of each sliding surface 211.

Figure 13:
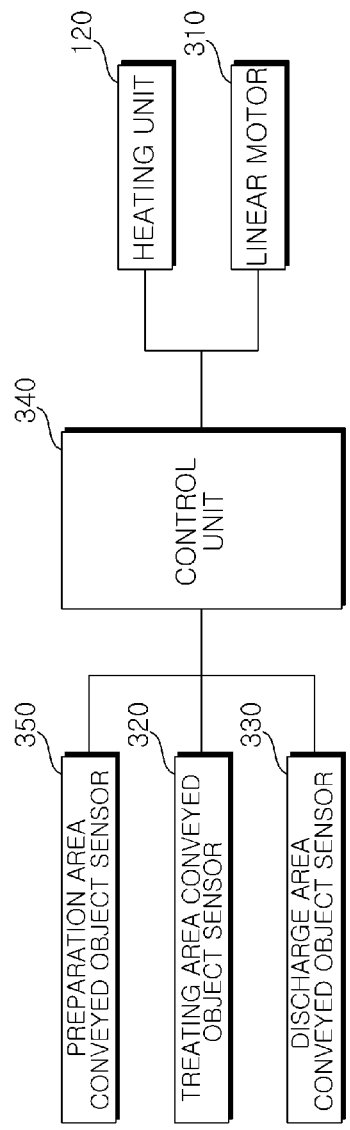
FIG. 13 is a control block diagram of a fabric treating apparatus according to an embodiment of the present invention.

FIG. 13 is a control block diagram of a fabric treating apparatus according to an embodiment of the present invention.

Referring to FIG. 13, the fabric treating apparatus according to an embodiment of the present invention may include a conveyed object sensor for detecting a conveyed object, a drive unit for moving the lifter 250 in a vertical direction intersecting a first direction, the control unit 340 for controlling the drive unit based on the position of the conveyed object inputted from the conveyed object sensor, and the heating unit 120 for supplying at least one of heat and steam to the treating area S2.

The control unit 340 controls the drive unit or the heating unit 120 based on the position of the conveyed object inputted from the conveyed object sensor. The control unit 340 controls to treat the conveyed object according to the position of the conveyed object or to move the conveyed object to a next stage.

Specifically, when it is determined that the conveyed object exists in the preparation area S1, the control unit 340 operates the drive unit for a preset time. In detail, the control unit 340 moves the linear motor 310 forward and rearward once when the conveyed object is detected by the preparation area conveyed object sensor 350. Accordingly, the lifter 250 is lifted once by the one-time forward and rearward movement of the linear motor 310, so that the conveyed object is moved to the next stage. Lifting means a rising and a falling.

More specifically, when the conveyed object does not exist in the treating area S2 and the conveyed object exists in at least one of the restraining areas of the preparation area S1, the control unit 340 may control the drive unit until the conveyed object is positioned in the treating area S2. That is, when a conveyed object is not detected by the treating area conveyed object sensor 320 and the conveyed object is detected by the preparation area S1 sensor, the control unit 340 continuously operates the linear motor 310 until the conveyed object is detected by the treating area conveyed object sensor 320.

As another example, when it is determined that the conveyed object exists in the treating area S2, the control unit 340 may operate the heating unit 120 for a preset time and then operate the drive unit for a preset time.

In detail, the control unit 340 treats the conveyed object of the treating area S2 by operating the heating unit 120, when the conveyed object is detected by the treating area conveyed object sensor 320. The control unit 340 moves the linear motor 310 forward and rearward once, when the treating of the conveyed object in the treating area S2 is completed. Accordingly, the conveyed object which has been treated in the treating area S2 is moved to the discharge area S3, and the conveyed object of the preparation area S1 adjacent to the treating area S2 is moved to the treating area S2.

As another example, the control unit 340 may stop the drive unit, when the conveyed object exists in the discharge area S3. In detail, the control unit 340 stops the heating unit 120 and stops the drive unit, when the conveyed object is detected by the discharge area conveyed object sensor 330. That is, the control unit 340 stops the heating unit 120 and the drive unit, when it is determined that the control unit 340 has an insufficient loading space.

In addition, the control unit 340 may output a discharge space shortage signal, when the conveyed object exists in the discharge area S3. In detail, when the conveyed object is detected by the discharge area conveyed object sensor 330, the control unit 340 outputs the discharge space shortage signal, and the fabric treating apparatus outputs a visual alarm and/or a acoustic alarm according to the discharge space shortage signal.

As another example, in the case where the conveyed object exists in the preparation area S1, the control unit 340 does not operate the drive unit when the conveyed object exists in the discharge area S3. In addition, in the case where the conveyed object exists in the preparation area S1, the control unit 340 operates the drive unit for a preset time when the conveyed object does not exist in the discharge area S3.

That is, in the case where the conveyed object exists in the preparation area S1, when the loading space is secured in the discharge area S3, the linear motor 310 is moved forward and rearward once, and the conveyed object is moved to the next stage.

Figure 14:
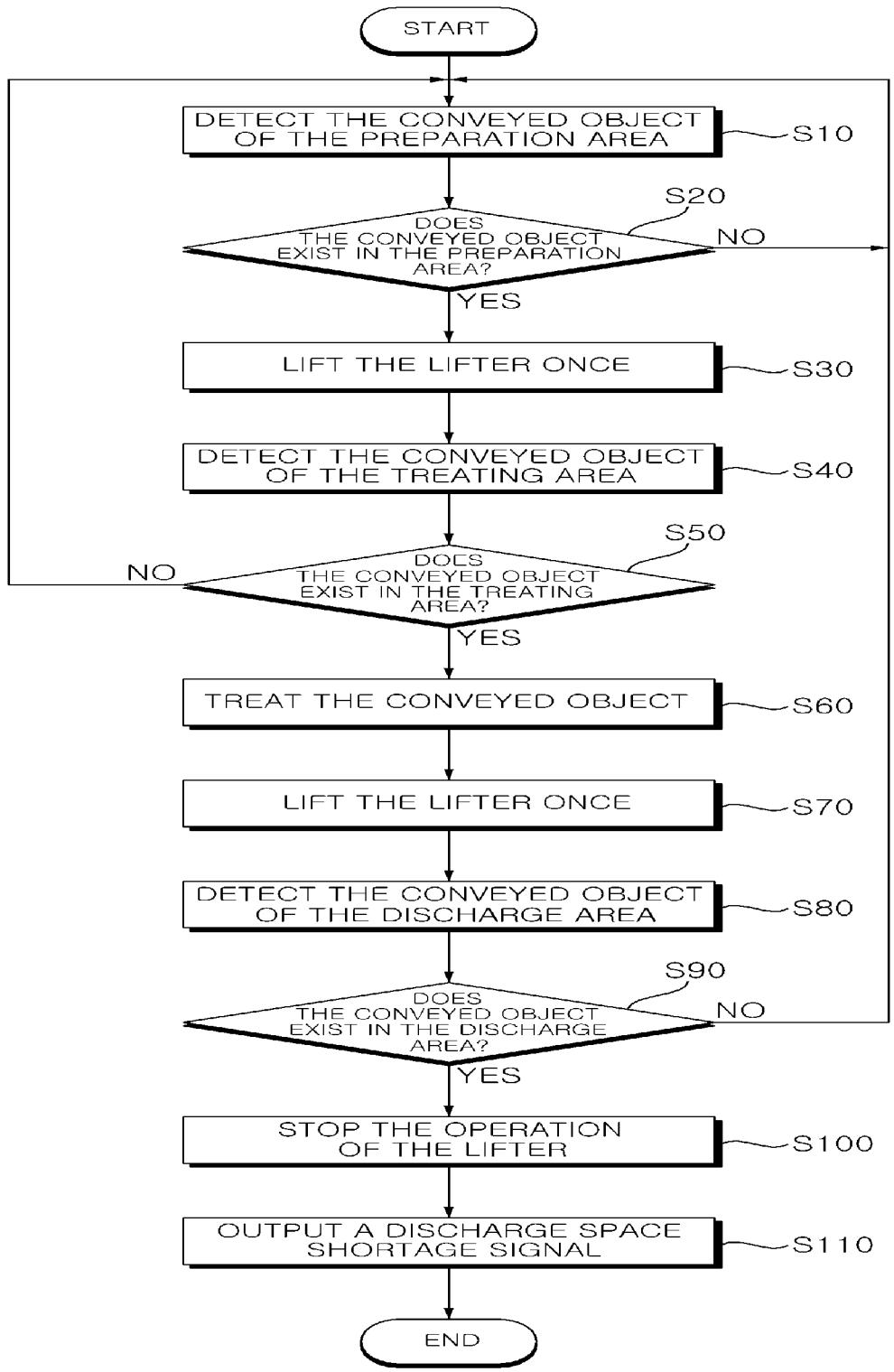
FIG. 14 is a flowchart illustrating a method of controlling a fabric treating apparatus according to an embodiment of the present invention.

FIG. 14 is a flowchart illustrating a method of controlling a fabric treating apparatus according to an embodiment of the present invention.

Referring to FIG. 14, the method of controlling a fabric treating apparatus according to an embodiment of the present invention may include a step of detecting a conveyed object of the preparation area S1, a step of lifting the lifter 250 once when the conveyed object exists in the preparation area S1, a step of detecting the conveyed object in the treating area S2, and a step of lifting the lifter 250 once after supplying at least one of hot air and steam to the treating area S2, when the conveyed object exists in the treating area S2.

The conveyed object of the preparation area S1 is detected. Specifically, the preparation area conveyed object sensor 350 detects the conveyed object of the preparation area S1 (S10).

It is determined whether the conveyed object exists in the preparation area S1 (S20). Based on a signal inputted from the preparation area conveyed object sensor 350, the control unit 340 determines whether the conveyed object exists in the preparation area S1, and determines a sliding surface 211 in which the conveyed object position is positioned in the preparation area S1.

When the conveyed object exists in the preparation area S1, the lifter 250 is lifted once (S30). In detail, when it is determined that the conveyed object exists in the preparation area S1, the control unit 340 moves the linear motor 310 forward and rearward once. When the linear motor 310 is rotated forward and rearward, the lifter 250 moves up and down, and moves the conveyed object to the next stage.

The above steps may be repeated until the conveyed object is positioned in the treating area S2.

The conveyed object of the treating area S2 is detected. In detail, the treating area conveyed object sensor 320 detects the conveyed object of the treating area S2 (S40).

It is determined whether the conveyed object exists in the treating area S2 (S50). In detail, the control unit 340 determines whether the conveyed object exists in the treating area S2 based on a signal inputted from the treating area conveyed object sensor 320.

If the conveyed object exists in the treating area S2, the conveyed object is treated (S60). In detail, when it is determined that the conveyed object exists in the treating area S2, the control unit 340 controls the heating unit 120 to supply at least one of hot air and steam to the treating area S2.

If the conveyed object exists in the treating area S2, the lifter 250 is lifted once (S70). Specifically, when it is determined that the conveyed object exists in the treating area S2, the control unit 340 moves the linear motor 310 forward and rearward once. When the linear motor 310 is moved forward and rearward, the lifter 250 moves up and down, and moves the conveyed object to the next stage. Accordingly, the conveyed object which has been treated in the treating area S2 is conveyed to the discharge area S3.

In addition, the embodiment of the present invention may further include a step of detecting the discharge area conveyed object, a step of stopping the operation of the lifter 250 when the conveyed object exists in the discharge area S3, and a step of outputting a discharge space shortage signal when the conveyed object exists in the discharge area S3.

The conveyed object of the discharge area S3 is detected. In detail, the discharge area conveyed object sensor 330 detects the conveyed object of the discharge area S3 (S80).

It is determined whether the conveyed object exists in the discharge area S3 (S90). In detail, the control unit 340 determines whether the conveyed object exists in the discharge area S3 based on a signal inputted from the discharge area conveyed object sensor 330.

When the conveyed object exists in the discharge area S3, the operation of the lifter 250 or/and the heating unit 120 is stopped (S100). When it is determined that the conveyed object exists in the discharge area S3, the control unit 340 may determine that the loading space is insufficient in the discharge area S3, and stop the operation of the fabric treating apparatus. The control unit 340 may stop the heating unit 120 and the lifter 250 when it is determined that the conveyed object exists in the discharge area S3.

When the conveyed object exists in the discharge area S3, a discharge space shortage signal is outputted (S110). Specifically, when it is determined that the conveyed object exists in the discharge area S3, the control unit 340 outputs the discharge space shortage signal is outputted, so that the user recognizes that there is no loading space of the discharge area S3. The clothing treating apparatus may output an alarm that can be visually recognized or acoustically recognized when the discharge space shortage signal is input.

Any one of the above-described steps may be omitted, or the order of the above-described steps may be reversed.

Figure 15:
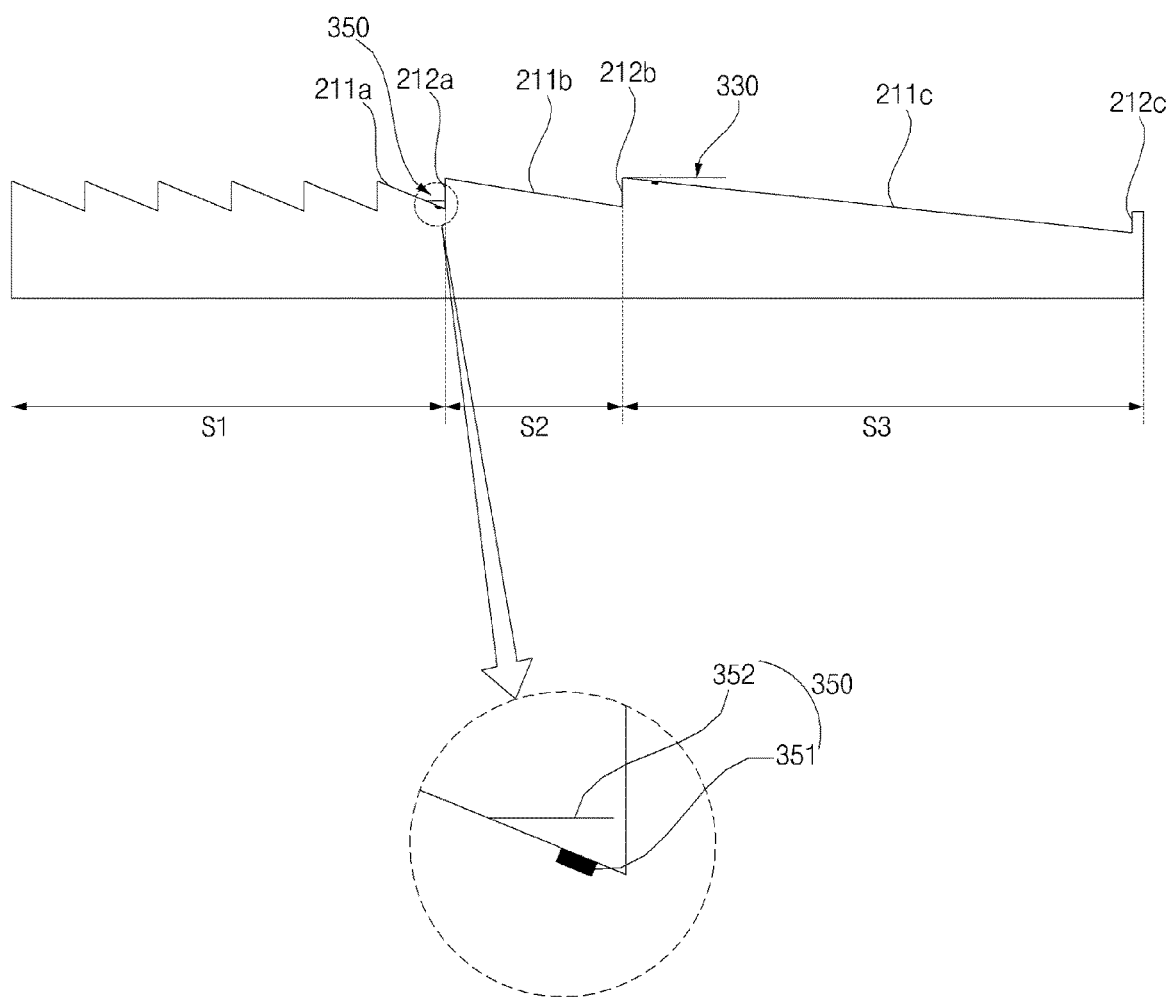
FIG. 15 is a conceptual diagram of a conveying device according to still another embodiment of the present invention.

FIG. 15 is a conceptual diagram of a conveying device according to still another embodiment of the present invention.

Referring to FIG. 15, in comparison with the embodiment of FIG. 13, a conveying device 200C according to still another embodiment has a difference in the number of sensors disposed in the preparation area S1, and has a difference in that the treating area conveyed object sensor 320 is omitted.

Since a high temperature steam is supplied to the treating area S2, the sensor is more likely to be damaged, and thus the conveyed object sensor may be omitted.

A plurality of preparation area conveyed object sensors 350 may be disposed. However, in order to reduce manufacturing costs, the preparation area conveyed object sensor 350 may be disposed in the sliding surface 211 of the preparation area S1 adjacent to the treating area S2.

Figure 16:
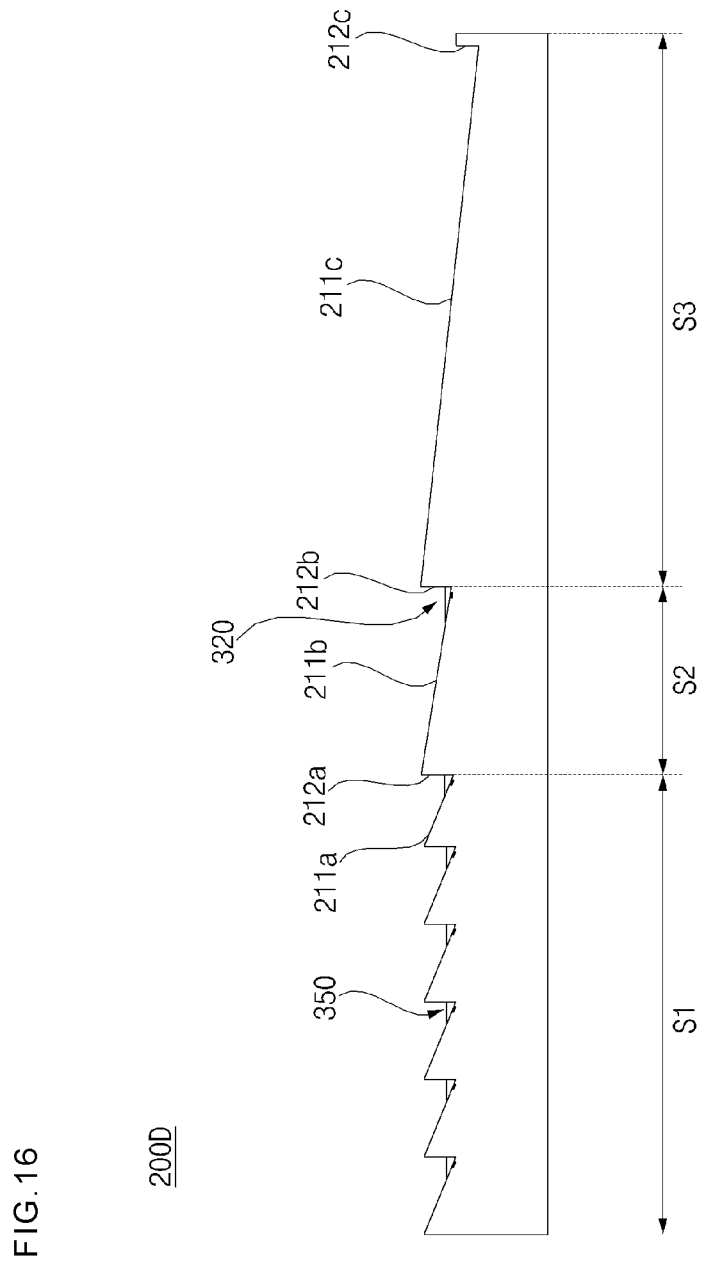
FIG. 16 is a conceptual diagram of a conveying device according to still another embodiment of the present invention.

FIG. 16 is a conceptual diagram of a conveying device according to still another embodiment of the present invention.

Referring to FIG. 16, in comparison with the embodiment of FIG. 13, a conveying device 200D according to still another embodiment has a difference in that the discharge area conveyed object sensor 330 is omitted.

Figure 17:
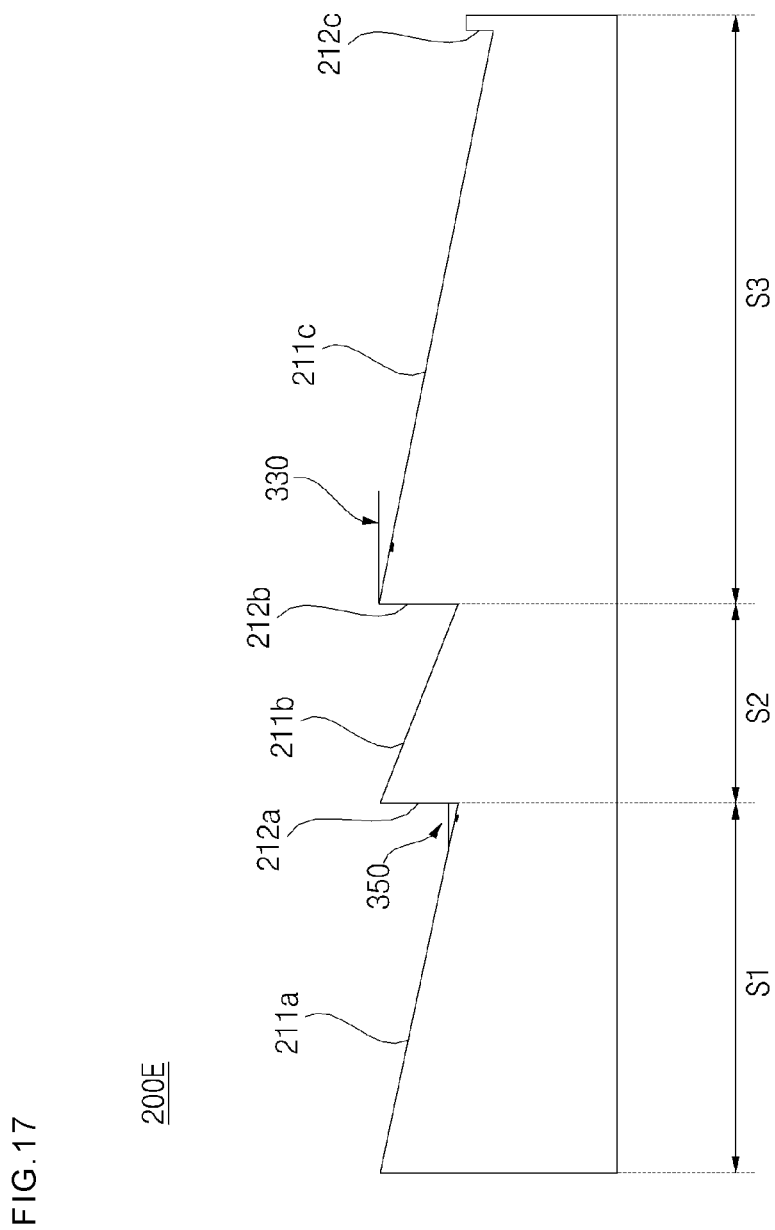
FIG. 17 is a conceptual diagram of a conveying device according to still another embodiment of the present invention.

FIG. 17 is a conceptual diagram of a conveying device according to still another embodiment of the present invention.

Referring to FIG. 17, in a conveying device 200E according to still another embodiment, the preparation area conveyed object sensor 350 and the discharge area conveyed object sensor 330 are additionally disposed in the conveying device of FIG. 11.

Since a single sliding surface 211 of the preparation area S1 is provided, a single preparation area conveyed object sensor 350 may be disposed.

Figure 18:
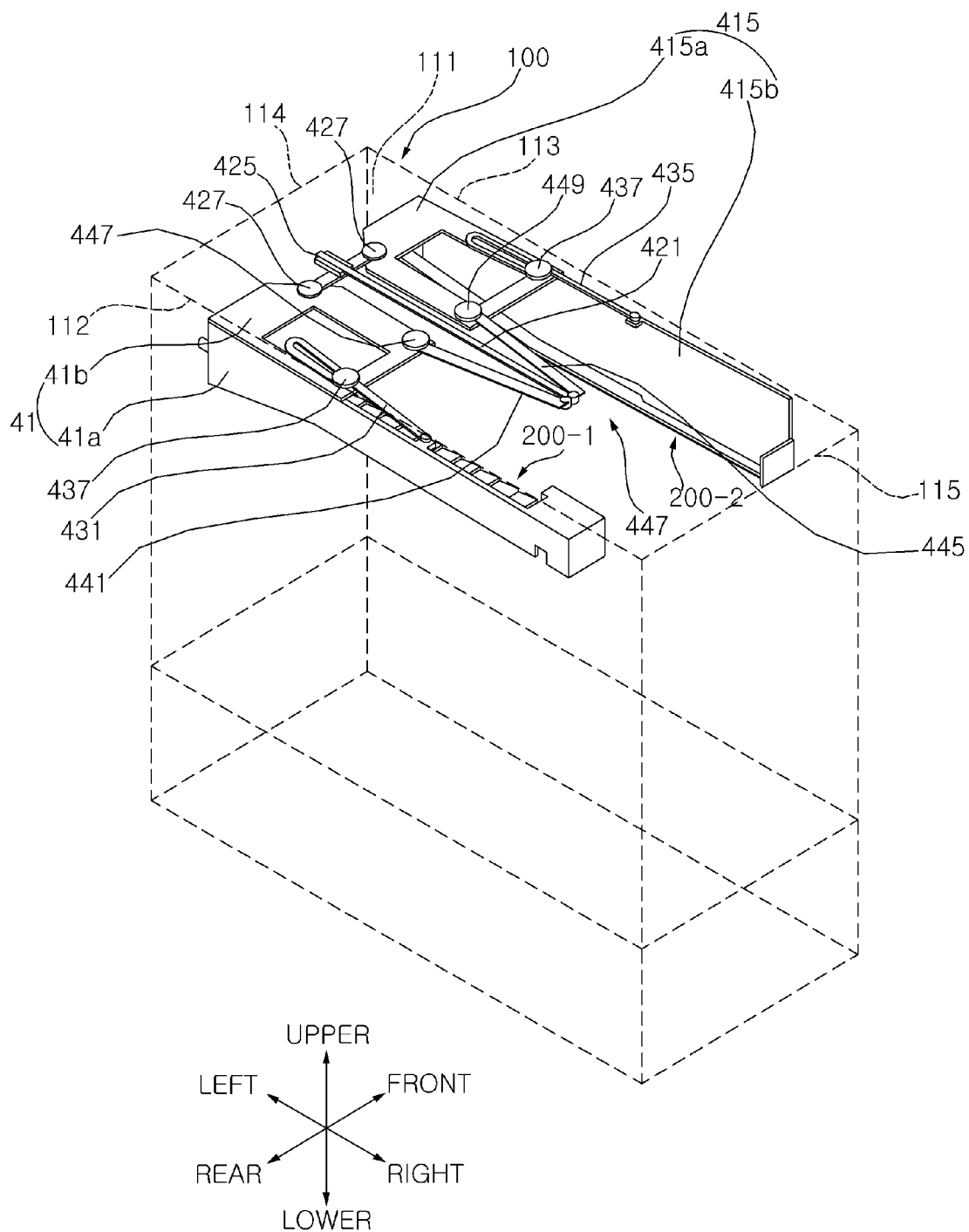
FIG. 18 is a perspective view of a fabric treating apparatus according to another embodiment of the present invention.
Figure 19:
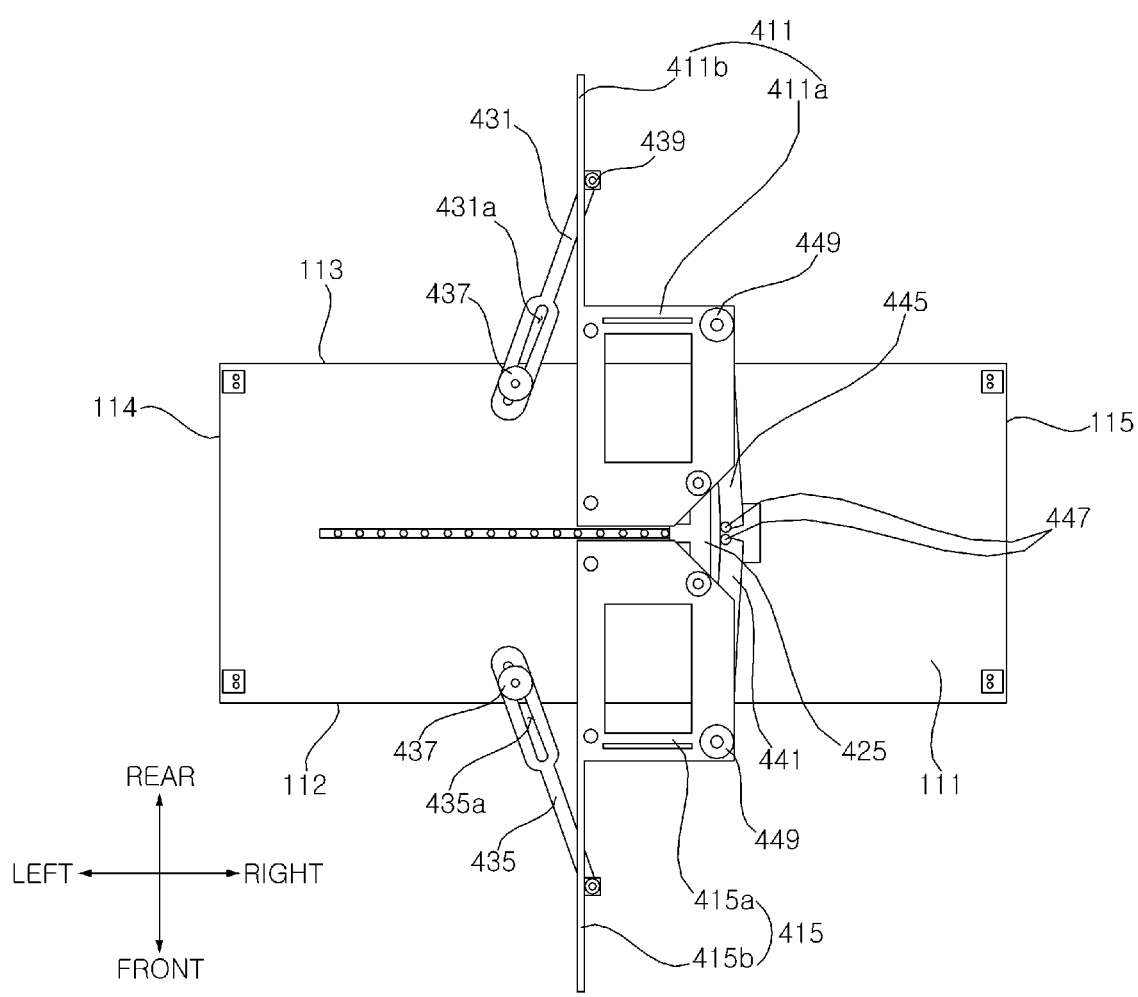
FIG. 19 is a diagram illustrating the fabric treating apparatus of FIG. 18 that removed conveyers when viewed from below.
Figure 20:
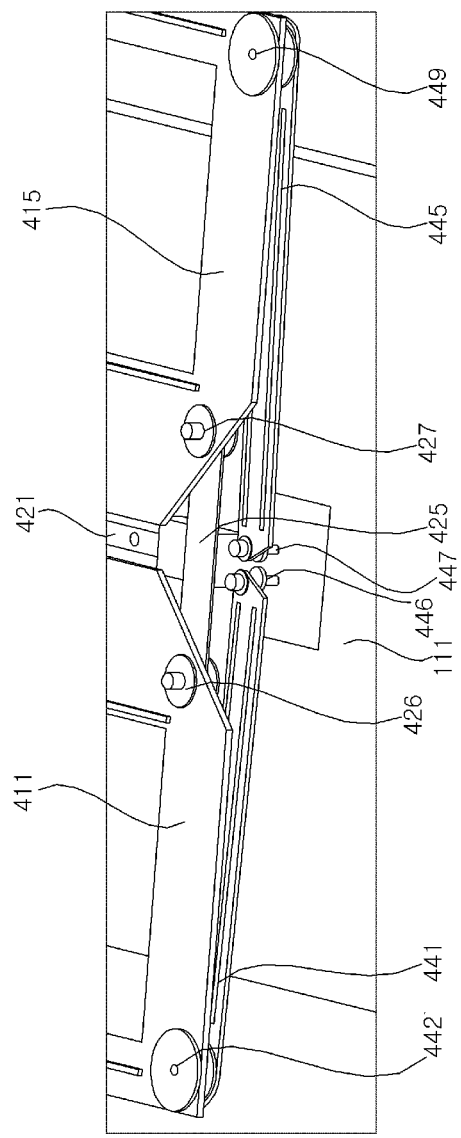
FIG. 20 is a partial perspective view illustrating a portion of FIG. 19.
Figure 21:
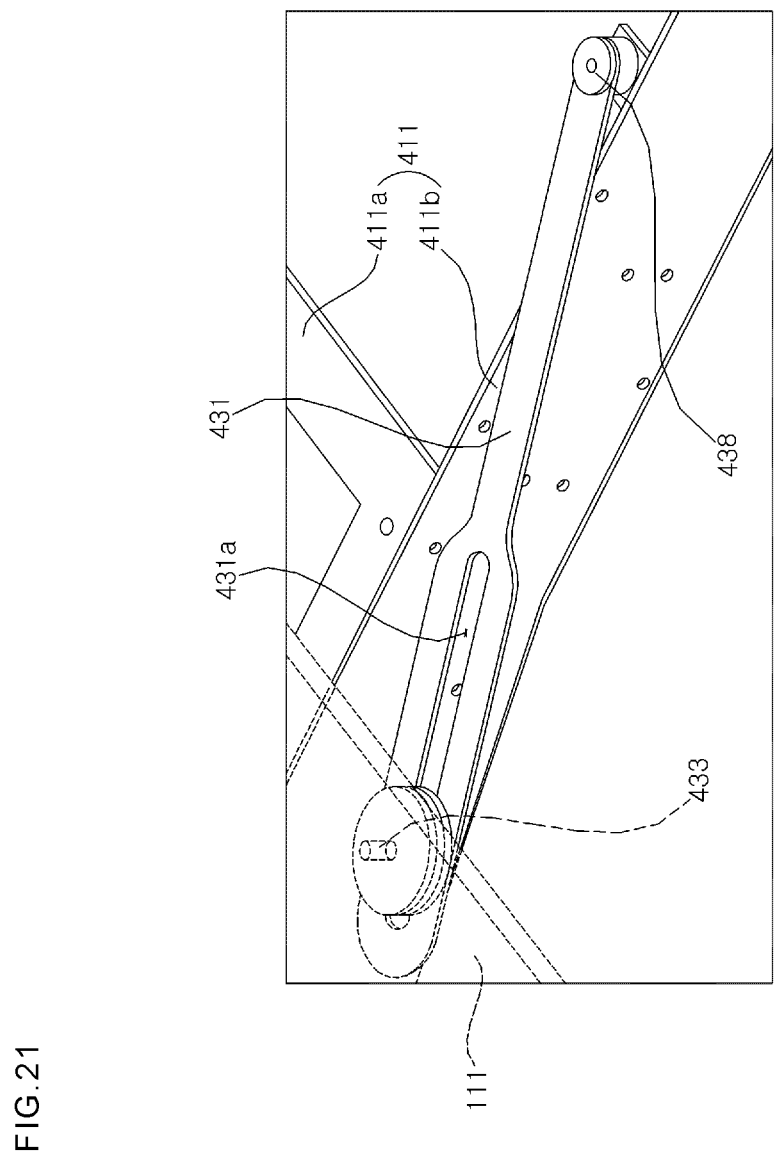
FIG. 21 is a perspective view illustrating the periphery of a stay link of FIG. 18.

FIG. 18 is a perspective view of a fabric treating apparatus according to another embodiment of the present invention, FIG. 19 is a diagram illustrating the fabric treating apparatus of FIG. 18 that removed conveyers when viewed from below, FIG. 20 is a partial perspective view illustrating a portion of FIG. 19, and FIG. 21 is a perspective view illustrating the periphery of a stay link of FIG. 18.

Referring to FIGS. 18 to 21, the conveying device 200 described above may be folded in a non-use to be accommodated inside the cabinet 100, and unfolded in use to be partly exposed to the outside.

The conveying device 200 may include a first conveyer 200-1 and a second conveyer 200-2 to be folded and accommodated in the cabinet 100. The first conveyer 200-1 and the second conveyer 200-2 may have a structure of being coupled in a first state in which a door (not shown) is opened, and separated in a second state in which the door is closed.

Here, the first state means a state in which the first conveyer 200-1 and the second conveyer 200-2 are disposed in the form of numeral 1, and one ends thereof are connected to each other, and the second state means a state in which the first conveyer 200-1 and the second conveyer 200-2 are separated from each other, and are disposed in the form of numeral 11.

For example, the first conveyer 200-1 may include a first frame 220 including a preparation area S1 and a treating area S2, a lifter 250 and a mover 270 accommodated in the first frame 220, and the second conveyer 200-2 may include a second frame 230 including the discharge area S3.

Obviously, as another example, each conveyer may be provided with a frame, a lifter, and a mover. In addition, the first conveyer 200-1 may include the preparation area S1, and the second conveyer 200-2 may include the treating area S2 and the discharge area S3. However, the first conveyer 200-1 and the second conveyer 200-2 are not limited thereto.

The conveying device 200 including the first conveyer 200-1 and the second conveyer 200-2 may include the conveying device 200 of FIGS. 1 to 17. Hereinafter, it will be described on the assumption that the first conveyer 200-1 may include the first frame 220 including the preparation area S1 and the treating area S2, and the lifter 250 and the mover 270 accommodated in the first frame 220, and the second conveyer 200-2 includes the second frame 230 including the discharge area S3.

A fabric treating apparatus according to another embodiment of the present invention may include a cabinet 100 defining a treating chamber 110 in which clothes is accommodated, a first conveyer 200-1 and a second conveyer 200-2 for conveying clothes in one direction, a first fixing member 411 to which the first conveyer 200-1 is fixed and which is rotatably installed in the cabinet 100, and a second fixing member 415 to which the second conveyer 200-2 is fixed and which is rotatably installed in the cabinet 100.

The first fixing member 411 rotatably fixes the first conveyer 200-1 to the cabinet 100. The first fixing member 411 may be rotatably coupled to an upper surface 111 of the cabinet 100. Specifically, by the rotation of the first fixing member 411, the first conveyer 200-1 is converted into a first state of being positioned inside the treating chamber 110, and a second state where a part of the first conveyer 200-1 is exposed to the outside of the treating chamber 110.

In the first state, the first conveyer 200-1 is disposed in parallel with the longitudinal direction of the cabinet 100, and in the second state, the first conveyer 200-1 is disposed to intersect with the longitudinal direction of the cabinet 100. The longitudinal direction of the cabinet 100 means a left and right direction in FIG. 18. That is, in the first state, the first conveyer 200-1 may be disposed in parallel with the left and right direction, and in the second state, the first conveyer 200-1 may be disposed in parallel with the front and rear direction.

The length of the first conveyer 200-1 may be larger than the width (length in the front and rear direction) of the cabinet 100 and may be smaller than the length of the cabinet 100. Therefore, when the conveyer is positioned inside the cabinet 100 in the first state, positioned outside in the second state, and the conveyer is unfolded while maximizing the internal space of the cabinet 100, a space for treating a plurality of clothes can be secured.

The first fixing member 411 may include a single member defining a single surface, or may include two members defining two surfaces in consideration of the rigidity and the connection of the door.

For example, the first fixing member 411 may include a first portion 411a of the cabinet 100 and a second portion 411b which defines a surface intersecting with the first portion 411a. The first portion 411a defines a surface parallel to the upper surface 111 of the cabinet 100, and the second portion 411b may define a surface that is connected to one end of the first portion 411a, and intersects with the upper surface 111 of the cabinet 100.

The first conveyer 200-1 may be fixed to the first portion 411a, but is preferably fixed to the second portion 411b.

One surface of the first fixing member 411 may define a door that opens and closes the cabinet 100. Specifically, the front and rear direction of the cabinet 100 are opened, and may be closed by a door. The second portion 411b of the first fixing member 411 may define the door, or the second portion 411b may be coupled with the door. More specifically, the second portion 411b may be coupled with the door that opens and closes the rear surface 112 of the cabinet 100.

The second fixing member 415 rotatably fixes the second conveyer 200-2 to the cabinet 100. The second fixing member 415 may be rotatably coupled to the upper surface 111 of the cabinet 100. Specifically, by the rotation of the second fixing member 415, the second conveyer 200-2 is converted into the first state of being positioned inside the treating chamber 110 and the second state where a part of the second conveyer 200-2 is exposed to the outside of the treating chamber 110.

In the first state, the second conveyer 200-2 is disposed in parallel with the longitudinal direction of the cabinet 100, and in the second state, the second conveyer 200-2 may be disposed to intersect with the longitudinal direction of the cabinet 100. The longitudinal direction of the cabinet 100 means the left and right direction in FIG. 18. That is, in the first state, the second conveyer 200-2 may be disposed in parallel with the left and right direction, and in the second state, the second conveyer 200-2 may be disposed in parallel with the front and rear direction.

The length of the second conveyer 200-2 may be larger than the width (the length in the front and rear direction) of the cabinet 100, and may be smaller than the length of the cabinet 100. More specifically, the length of the second conveyer 200-2 may be larger than the width (the length in the front and rear direction) of the upper surface 111 of the cabinet 100, and may be smaller than the length of the upper surface 111 of the cabinet 100. Accordingly, when the conveyer is positioned inside the cabinet 100 in the first state, positioned outside in the second state, and the conveyer is unfolded while maximizing an internal space of the cabinet 100, a space for treating a plurality of clothes can be secured.

The second fixing member 415 may include a single member defining a single surface, and may include two members defining two surfaces in consideration of the rigidity and the connection of the door.

For example, the second fixing member 415 may include a third portion 415a of the cabinet 100 and a fourth portion 415b which defines a surface intersecting with the third portion 415a. The third portion 415a defines a surface parallel to the upper surface 111 of the cabinet 100, and the fourth portion 415b may define a surface that is connected to one end of the third portion 415a, and intersects with the upper surface 111 of the cabinet 100.

The second conveyer 200-2 may be fixed to the third portion 415a, but is preferably fixed to the fourth portion 415b.

One surface of the second fixing member 415 may define a door that opens and closes the cabinet 100. Specifically, the fourth portion 415b of the second fixing member 415 may define the door, or the fourth portion 415b may be coupled with the door. More specifically, the fourth portion 415b may be coupled with the door that opens and closes the front surface 113 of the cabinet 100.

The first fixing member 411 and the second fixing member 415 may be rotated about a rotation shaft that intersects with the upper surface 111 of the cabinet 100. Specifically, the first fixing member 411 and the second fixing member 415 are rotated about a rotation shaft parallel to the vertical direction.

The first fixing member 411 and the second fixing member 415 may be rotated separately but, for the convenience of the user, may have a structure in which the other is rotated together when one is rotated. That is, the first fixing member 411 may have a structure of being rotated together with the second fixing member 415.

In addition, one end of the first fixing member 411 and the second fixing member 415 is positioned adjacent to one end of the upper surface 111 of the cabinet 100 in the longitudinal direction in the first state, and may be positioned adjacent to the center of the upper surface 111 of the cabinet 100 in the longitudinal direction in the second state. That is, the left end (FIG. 18) of the first fixing member 411 and the second fixing member 415 is positioned adjacent to one end of the cabinet 100 in the longitudinal direction in the first state, and may be positioned adjacent to the center of the longitudinal direction of the cabinet 100 in the second state. When the first fixing member 411 and the second fixing member 415 are rotated and moved in such a way, it is possible to accommodate a conveyer having a larger length than when only the rotation is performed.

For example, the embodiment may further include a guide block 425 and a guide rail 421 so that the first fixing member 411 and the second fixing member 415 can rotate together, and one end of the first fixing member 411 and the second fixing member 415 may reciprocate in the longitudinal direction.

The guide rail 421 provides a path through which the guide block 425 can reciprocate along the longitudinal direction of the cabinet 100. The guide rail 421 provides a space in which the guide block 425 slides. The guide rail 421 may be coupled to the cabinet 100. In detail, the guide rail 421 may be coupled to the upper surface 111 of the cabinet 100 to secure a work space.

The guide rail 421 may be extended in the longitudinal direction of the cabinet 100. Specifically, one end of the guide rail 421 is positioned adjacent to one end (left end) of the cabinet 100 in the longitudinal direction, and the other end of the guide rail 421 is positioned adjacent to the center of the cabinet 100 in the longitudinal direction.

Therefore, in the folded state of each conveyer, the conveyer having the longest length may be designed by using the length of the cabinet 100, and in the unfolded state of each conveyer, each conveyer is extended lengthways in the width direction of the cabinet 100 from the center of the cabinet 100 in the longitudinal direction, so that a space for treating a plurality of clothes may be secured. More specifically, the guide rail 421 may be disposed in the center of the upper surface 111 of the cabinet 100 in the width direction.

The first fixing member 411 and the second fixing member 415 are rotatably coupled to the guide block 425. The guide block 425 moves along the guide rail 421. The guide block 425 moves along the guide rail 421 by the rotation of each fixing member 411 and 415.

The guide block 425 is extended in the width direction to prevent interference when each fixing member 411 and 415 rotates, and one side of each of the fixing members 411 and 415 may be coupled with both ends of the guide block 425 in the width direction.

The guide block 425 and each fixing member 411 and 415 may be connected by the respective block hinges 426 and 427.

Although the coupling position of each block hinge 426, 427 is not limited, it is preferably positioned adjacent to one end of the longitudinal direction of each fixing member 411,415. In addition, each of the block hinges 426 and 427 is preferably coupled adjacent to one end of each fixing member 411 and 415 in the width direction. In detail, each of the block hinges 426 and 427 may be coupled to the left end and the inner end of each of the fixing members 411 and 415. Obviously, each block hinge may be coupled to the first portion 411a of the first fixing member 411 and the third portion 415a of the second fixing member 415.

The block hinge may include a first block hinge 426 and a second block hinge 427 connecting the first fixing member 411 and the guide block 425. The position of the first block hinge 426 and the second block hinge 427 is not limited. However, it is preferable that the positions of the first block hinge 426 and the second block hinge 427 are symmetrically disposed based on the guide rail 421 in terms of symmetrical movement of the first fixing member 411 and the second fixing member 415.

The first fixing member 411 and the second fixing member 415 are coupled to the guide block 425 and moved while rotating together, so that each fixing member 411, 415 can be moved symmetrically. Thus, when only the door of the clothes loading direction is opened, the door of the clothes discharge direction may be opened together, and when only the door of the clothes loading direction is closed, the door of the clothes discharge direction may be closed together.

The embodiment may include a first stay link 431 and a second stay link 435 so that each fixing member 411, 415 may protrude to the outside of the cabinet 100 in the unfolded state to secure a wide working space, and the drooping of each fixing member 411 and 415 protruded to the outside of the cabinet 100 may be prevented. In addition, the first stay link 431 and the second stay link 435 interact with the guide block 425 to define a movement and rotation path of each fixing member 411 and 415.

When the conveyer is unfolded by the first stay link 431, the second stay link 435, and the guide block 425, the conveyer is disposed in the center between the left side surface and the right side surface of the cabinet 100 so that the clothes hung on the conveyer can be prevented from the interference with the side surface of the cabinet 100. That is, a hanging space of the clothes can be additionally secured than when each fixing member 411, 415 is rotated simply about a single axis.

One end of the first stay link 431 may be rotatably coupled to the first fixing member 411, and the other end of the first stay link 431 may be rotatably coupled to the cabinet 100. Specifically, one end of the first stay link 431 is coupled to the first portion 411a of the first fixing member 411, and the other end of the first stay link 431 is coupled to the upper surface 111 of the cabinet 100.

The position at which the first stay link 431 is coupled to the first fixing member 411 may be positioned adjacent to the center in the longitudinal direction than the position at which the guide block 425 is coupled. The first stay link 431 and the first fixing member 411 may be connected by a first hanging hinge 438.

The upper surfaces 111 of the first stay link 431 and the cabinet 100 are connected by a first stay hinge 433, and the first stay hinge 433 may be disposed adjacent to the edge of the cabinet 100 than the first block hinge 426.

More specifically, the first stay hinge 433 may be coupled to a position that is adjacent to the rear end of the upper surface 111 of the cabinet 100 and adjacent to the center of the upper surface 111 of the cabinet 100 in the longitudinal direction.

One end of the second stay link 435 may be rotatably coupled to the second fixing member 415, and the other end of the second stay link 435 may be rotatably coupled to the cabinet 100. Specifically, one end of the second stay link 435 is coupled to the third portion 415a of the second fixing member 415, and the other end of the second stay link 435 is coupled to the upper surface 111 of the cabinet 100.

The position at which the second stay link 435 is coupled to the second fixing member 415 may be positioned adjacent to the center in the longitudinal direction than the position at which the guide block 425 is coupled. The second stay link 435 and the second fixing member 415 may be connected by a second hanging hinge 439.

The upper surfaces 111 of the second stay link 435 and the cabinet 100 are connected by a second stay hinge 437, and the second stay hinge 437 may be disposed adjacent to the edge of the cabinet 100 than the second block hinge 427.

More specifically, the second stay hinge 437 may be coupled to a position that is adjacent to the front end of the upper surface 111 of the cabinet 100 and adjacent to the center of the upper surface 111 of the cabinet 100 in the longitudinal direction.

The length of the first stay link 431 and the length of the second stay link 435 may be different, but are preferably the same for symmetry movement and rotation.

The positions of the first stay hinge 433 and the second stay hinge 437 are preferably disposed symmetrically based on the guide rail 421. When the positions of the first stay hinge 433 and the second stay hinge 437 are not positioned in positions that are symmetrical based on the guide rail 421, the second fixing member 415 may not move by the rotation and movement of the first fixing member 411 or may not move symmetrically.

A long hole 431a, 435a to which each stay hinge is coupled may be formed in each stay link 431, 435. The long hole 431a, 435a adds degrees of freedom of movement to each stay link 431, 435 when each fixing member 411, 415 rotates and moves. The long hole 431a, 435a is extended in the longitudinal direction of each of the stay links 431 and 435 so that each stay link 431, 435 can be moved in the longitudinal direction of each stay link 431, 435.

Although the length of the long hole 431a, 435a is not limited, it is preferable that it is 20% to 50% of the length of each stay link 431, 435.

The embodiment may further include a first rotary link 441 and a second rotary link 445 so as to limit the possibility that the respective fixing member members 411 and 415 are not moved symmetrically, while the path of each fixing member 411, 415 is changed whenever the door is opened and closed.

One end of the first rotary link 441 is rotatably coupled to the first fixing member 411, and the other end of the first rotary link 441 is rotatably coupled to the cabinet 100. One end of the first rotary link 441 is rotatably coupled to the first portion 411a of the first fixing member 411, and the other end of the first rotary link 441 is rotatably coupled to the upper surface 111 of the cabinet 100.

The first rotary link 441 is connected to the cabinet 100 by a first rotary hinge 446, and is connected to the first fixing member 411 by a first fixing hinge 442. The first rotary hinge 446 may be coupled adjacent to the center of the upper surface 111 of the cabinet 100. In detail, the first rotary hinge 446 may be coupled to the right end of the guide rail 421 on the upper surface 111 of the cabinet 100.

The first fixing hinge 442 is disposed in the first fixing member 411 adjacent to the center of the longitudinal direction, and is positioned adjacent to the front end (see FIG. 18) in the width direction.

One end of the second rotary link 445 is rotatably coupled to the second fixing member 415, and the other end of the second rotary link 445 is rotatably coupled to the cabinet 100. One end of the second rotary link 445 is rotatably coupled to the third portion 415a of the second fixing member 415, and the other end of the second rotary link 445 is rotatably coupled to the upper surface 111 of the cabinet 100.

The second rotary link 445 is connected to the cabinet 100 by a second rotary hinge 447, and is connected to the second fixing member 415 by a second fixing hinge. The second rotary hinge 447 may be coupled adjacent to the center of the upper surface 111 of the cabinet 100. In detail, the second rotary hinge 447 may be coupled to the right end of the guide rail 421 on the upper surface 111 of the cabinet 100.

The second fixing hinge 449 is disposed in the second fixing member 415 adjacent to the center in the longitudinal direction, and is positioned adjacent to the rear end (see FIG. 18) in the width direction.

The length of the first rotary link 441 and the length of the first rotary link 441 may be different, but preferably may be the same for symmetry movement and rotation.

In addition, it is preferable that the positions of the first fixing hinge 442 and the second fixing hinge 449 are disposed symmetrically based on the guide rail 421. When the positions of the first fixing hinge 442 and the second fixing hinge 449 are not positioned in symmetrical positions based on the guide rail 421, the second fixing member may not move by the rotation and movement of the first fixing member 415, or may not move symmetrically.

In addition, it is preferable that the positions of the first rotary hinge 446 and the second rotary hinge 447 are disposed symmetrically based on the guide rail 421. When the position of the first rotary hinge 446 and the second rotary hinge 447 is not positioned in positions that are symmetrical based on the guide rail 421, the second fixing member may not move by the rotation and movement of the first fixing member 415, or may not move symmetrically.

Hereinafter, the operation of the present invention will be described in detail.

Figure 22:
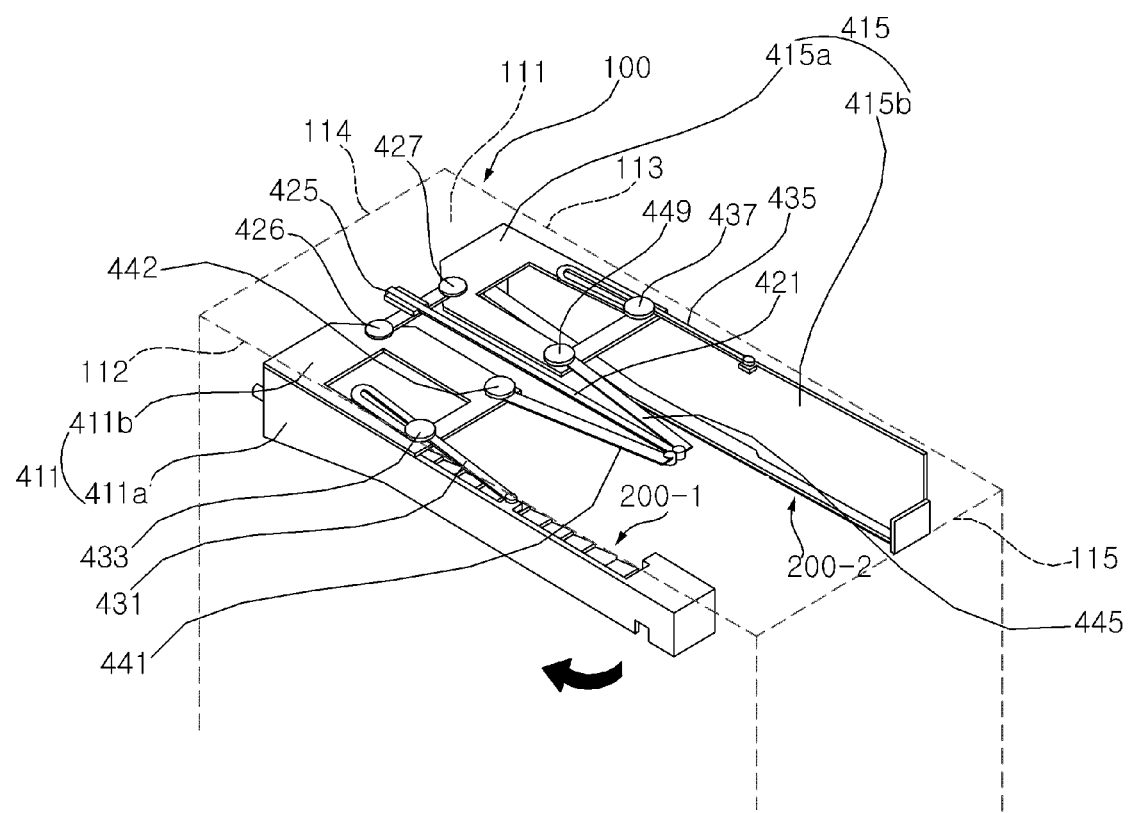
FIGS. 22 to 24 are reference diagrams for explaining the operation of a fabric treating apparatus according to another embodiment of the present invention.
Figure 23:
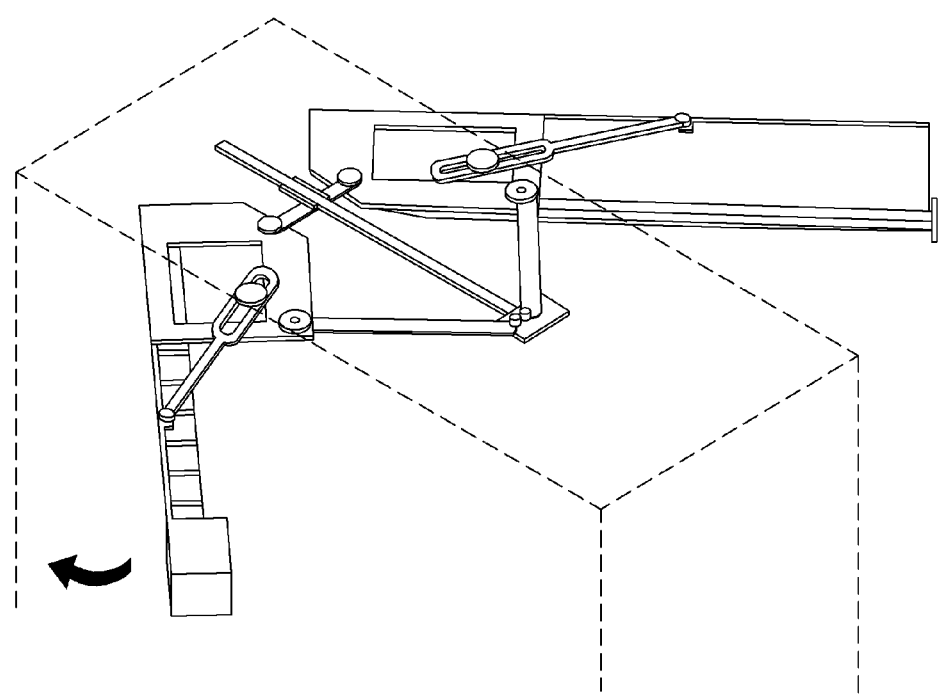
Figure 24:
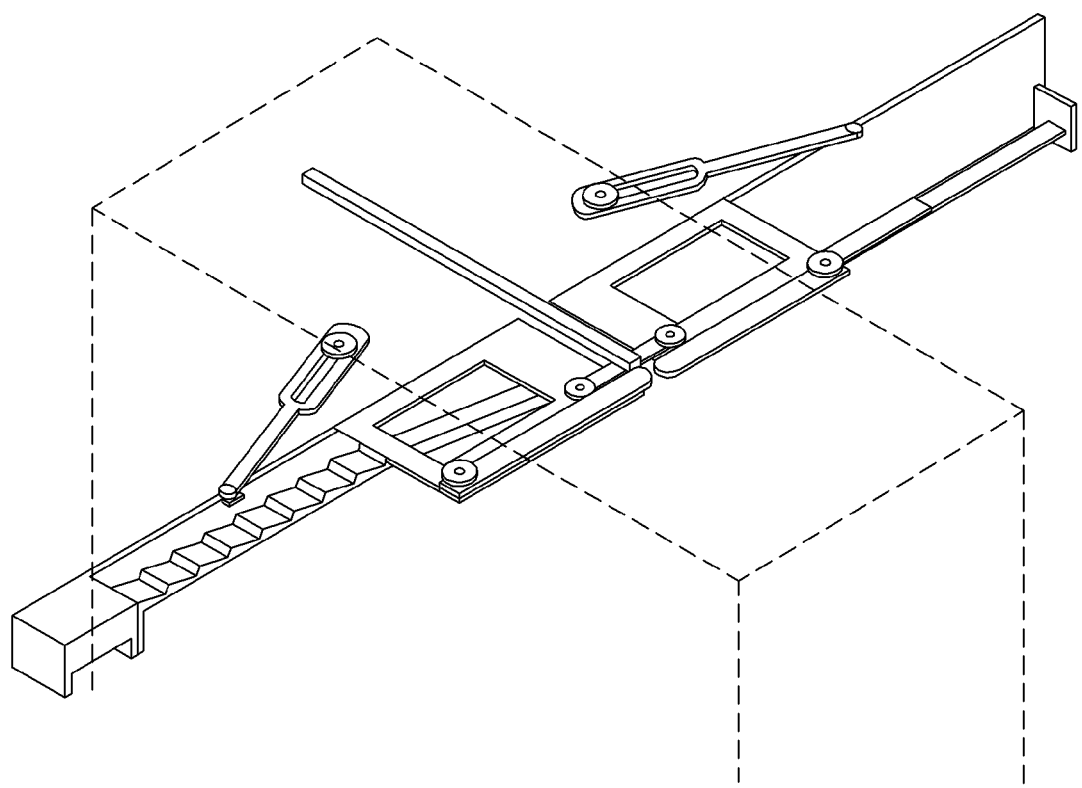

FIGS. 22 to 24 are reference diagrams for explaining the operation of a fabric treating apparatus according to another embodiment of the present invention.

Referring to FIG. 22, in the first state, the doors are in a closed state, and the first fixing member and the second fixing member are disposed in the form of numeral 11 parallel to the left and right direction, and are positioned inside the treating chamber. Obviously, the first conveyer and the second conveyer are disposed in the form of numeral 11 parallel to the left and right direction, and are positioned inside the treating chamber.

Referring to FIG. 23, when the rear or front side door is opened, the first fixing member and the second fixing member are rotated together with the door while using each block hinge and each stay hinge as an axis, and one end of each fixing member protrudes outward, and the other end of each fixing member is moved from the left end in the longitudinal direction to the center inside the treating chamber.

Referring to FIG. 24, when the door is completely opened horizontally in the front-rear direction, the first fixing member and the second fixing member are disposed on the same line, and one end of the first conveyer and one end of the second conveyer are connected to each other to form a single conveying device.

The fabric treating apparatus of the present invention having the above configuration has the following effects.

The present invention has a structure in which a large number of clothes are sequentially supplied to the treating chamber and discharged from the treating chamber, so that a large number of clothes can be automatically treated.

In addition, the present invention is accommodated in the interior of the cabinet when being folded, and a part of the conveyer is exposed to the outside of the cabinet when being opened, so that a space for treating a plurality of clothes can be secured when in use, and occupies a smaller space when not in use.

In addition, the present invention can improve the user's convenience as the two conveyer is rotated together and unfolded according to the opening of the door.

In addition, the present invention can prevent the drooping of the fixing member as the link that is free to move in the longitudinal direction when the conveyer is unfolded.

In addition, the present invention can reduce the manufacturing cost by a simple structure, increase durability by a simple structure, and is easy to manufacture, as clothes is supplied to the treating chamber and discharged from the treating chamber while the lifter moves in the vertical direction, when the mover moves in the front and rear direction through a single drive device.

In addition, in the present invention, the drive device is disposed in the front and rear direction with the lifter, and the lifter is moved up and down by the mover moving in the front and rear direction, so that the height of the conveying device is lowered, a space for treating the clothes is increased.

In addition, the present invention has a structure of folding the frame constituting the conveying device, so that the size is reduced when the fabric treating apparatus is not used, and it is easy to accommodate the fabric treating apparatus when not in use.

The effects of the present invention are not limited to the above-mentioned effects, and other effects not mentioned will be clearly understood by those skilled in the art from the description of the claims.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims. Accordingly, the scope of the present invention is not construed as being limited to the described embodiments but is defined by the appended claims as well as equivalents thereto.

What is claimed is:

1. A fabric treating apparatus comprising:
   a cabinet defining a treating chamber in which clothes are accommodated;
   a first conveyer and a second conveyer for conveying the clothes in one direction;
   a first fixing member to which the first conveyer is fixed;
   a second fixing member to which the second conveyer is fixed;
   a guide block to which the first fixing member and the second fixing member are rotatably coupled;
   a guide rail in which the guide block is slid, and which is coupled to the cabinet;
   a first stay link having one end rotatably coupled to the first fixing member and the other end rotatably coupled to the cabinet; and
   a second stay link having one end rotatably coupled to the second fixing member and the other end rotatably coupled to the cabinet.

2. The fabric treating apparatus of claim 1, wherein the guide rail, the first stay link, and the second stay link are coupled to an upper surface of the cabinet.

3. The fabric treating apparatus of claim 1, wherein the guide rail is extended in a longitudinal direction of the cabinet.

4. The fabric treating apparatus of claim 3, wherein one end of the guide rail is positioned adjacent to one end of the cabinet in the longitudinal direction, and the other end of the guide rail is positioned adjacent to a center of the cabinet in the longitudinal direction.

5. The fabric treating apparatus of claim 1, further comprising a block hinge for connecting the guide block and each fixing member,
   wherein the block hinge is positioned adjacent to one end of each fixing member in the longitudinal direction.

6. The fabric treating apparatus of claim 1, further comprising a stay hinge for connecting each stay link and the cabinet,
   wherein the stay hinge is disposed closer to an edge of the cabinet than the guide rail.

7. The fabric treating apparatus of claim 5, further comprising a stay hinge for connecting each stay link and the cabinet,
   wherein the stay hinge is disposed closer to an edge of the cabinet than the block hinge.

8. The fabric treating apparatus of claim 6, wherein each stay link further comprises a long hole to which each stay hinge is coupled,
   wherein the long hole is extended in the longitudinal direction of each stay link.

9. The fabric treating apparatus of claim 1, wherein a position at which the stay link is coupled to each fixing member is positioned adjacent to a center in the longitudinal direction than a position at which the guide block is coupled.

10. The fabric treating apparatus of claim 1, further comprising:
    a first rotary link having one end rotatably coupled to the first fixing member and the other end rotatably coupled to the cabinet; and
    a second rotary link having one end rotatably coupled to the second fixing member and the other end rotatably coupled to the cabinet.

11. A fabric treating apparatus comprising:
    a cabinet defining a treating chamber in which clothes are accommodated;
    a first conveyer and a second conveyer for conveying the clothes in one direction;
    a first fixing member to which the first conveyer is fixed, and which is rotatably installed in the cabinet; and
    a second fixing member to which the second conveyer is fixed, and which is rotatably installed in the cabinet, wherein the first conveyer is converted to a first state of being positioned inside the treating chamber, and a second state in which a part of the first conveyer is exposed to outside of the treating chamber, due to a rotation of the first fixing member, and the second conveyer is converted to a first state of being positioned inside the treating chamber, and a second state in which a part of the second conveyer is exposed to the outside of the treating chamber, due to a rotation of the second fixing member.

12. The fabric treating apparatus of claim 11, wherein the first fixing member is rotated together with the second fixing member.

13. The fabric treating apparatus of claim 11, further comprising:
   a guide block to which the first fixing member and the second fixing member are rotatably coupled; and
   a guide rail in which the guide block is to slide.

14. The fabric treating apparatus of claim 13, wherein the guide rail is extended in a longitudinal direction of the cabinet.

15. The fabric treating apparatus of claim 14, wherein a first end of the guide rail is positioned adjacent to one end of the cabinet in the longitudinal direction, and a second end of the guide rail is positioned adjacent to a center of the cabinet in the longitudinal direction.

16. The fabric treating apparatus of claim 11, wherein the first conveyer and the second conveyer are disposed in parallel with a longitudinal direction of the cabinet in the first state, and
   the first conveyer and the second conveyer are disposed to intersect with the longitudinal direction of the cabinet in the second state.

17. The fabric treating apparatus of claim 11, further comprising:
   a first stay link having a first end rotatably coupled to the first fixing member and a second end rotatably coupled to the cabinet; and
   a second stay link having a first end rotatably coupled to the second fixing member and a second end rotatably coupled to the cabinet.

18. The fabric treating apparatus of claim 17, wherein each stay link includes a long hole to which each stay hinge coupled to the cabinet is coupled,
   wherein the long hole is extended in the longitudinal direction of each stay link.

19. The fabric treating apparatus of claim 11, wherein one surface of each fixing member is coupled to a corresponding door for opening and closing the cabinet.

20. The fabric treating apparatus of claim 19, wherein each fixing member is installed on an upper surface of the cabinet, and the corresponding door opens and closes a side surface of the cabinet.

* * * * *

UNITED STATES PATENT AND TRADEMARK OFFICE
CERTIFICATE OF CORRECTION

| | | |
|---|---|---|
| PATENT NO. | : 11,390,984 B2 | Page 1 of 1 |
| APPLICATION NO. | : 16/590988 | |
| DATED | : July 19, 2022 | |
| INVENTOR(S) | : Jihyun Yoon et al. | |

It is certified that error appears in the above-identified patent and that said Letters Patent is hereby corrected as shown below:

On the Title Page

Column 1, insert:
-- (30)  Foreign Application Priority Data
Oct. 4, 2018 (KR) ....................................................10-2018-0118052 --

Signed and Sealed this
Eleventh Day of October, 2022

Katherine Kelly Vidal
*Director of the United States Patent and Trademark Office*